US011089153B2

(12) United States Patent
Scott

(10) Patent No.: US 11,089,153 B2
(45) Date of Patent: *Aug. 10, 2021

(54) MOBILE-DEVICE-BASED CARRIER VOICEMAIL REDUCTION

(71) Applicant: Daniel E. Scott, Taylorsville, UT (US)

(72) Inventor: Daniel E. Scott, Taylorsville, UT (US)

(*) Notice: Subject to any disclaimer, the term of this patent is extended or adjusted under 35 U.S.C. 154(b) by 0 days.

This patent is subject to a terminal disclaimer.

(21) Appl. No.: 16/443,425

(22) Filed: Jun. 17, 2019

(65) Prior Publication Data

US 2020/0112635 A1    Apr. 9, 2020

Related U.S. Application Data

(63) Continuation of application No. 15/968,729, filed on May 1, 2018, now Pat. No. 10,367,938, which is a
(Continued)

(51) Int. Cl.
| | |
|---|---|
| *H04M 3/436* | (2006.01) |
| *H04M 1/725* | (2006.01) |
| *H04M 1/64* | (2006.01) |
| *H04W 4/16* | (2009.01) |
| *H04M 1/57* | (2006.01) |
| *H04M 3/533* | (2006.01) |
| *H04M 3/42* | (2006.01) |
| *H04M 3/20* | (2006.01) |

(Continued)

(52) U.S. Cl.
CPC ............. *H04M 3/436* (2013.01); *H04M 1/57* (2013.01); *H04M 1/64* (2013.01); *H04M 1/72519* (2013.01); *H04M 3/20* (2013.01); *H04M 3/42017* (2013.01); *H04M 3/53358* (2013.01); *H04W 4/16* (2013.01); *H04M 1/571* (2013.01); *H04M 1/6505* (2013.01); *H04M 1/663* (2013.01); *H04M 3/533* (2013.01); *H04M 3/537* (2013.01); *H04M 3/53383* (2013.01)

(58) Field of Classification Search
CPC ............ H04M 3/436; H04M 3/53358; H04M 3/53383; H04M 3/537; H04M 3/20; H04M 3/42017; H04M 1/57; H04M 1/6505; H04M 3/533; H04M 1/663; H04W 4/16

See application file for complete search history.

(56) References Cited

U.S. PATENT DOCUMENTS

| | | | | |
|---|---|---|---|---|
| 2005/0089149 | A1* | 4/2005 | Elias | H04M 3/53308 379/88.13 |
| 2012/0053938 | A1* | 3/2012 | Trivi | H04M 3/53366 704/235 |

* cited by examiner

*Primary Examiner* — Minjung Kim
(74) *Attorney, Agent, or Firm* — Adam D. Stevens; Michael F. Krieger; Kirton McConkie

(57) ABSTRACT

A mobile device having phoning capabilities also include capabilities to optionally reduce an operating load on a centralized mobile carrier voicemail system. The user of the mobile device is presented with a notification of an incoming call and is provided with an opportunity to answer the call in a traditional fashion, to optionally engage the centralized mobile carrier voicemail system, or to instead have the mobile device manage options relating to locally obtaining a voicemail from a maker of the incoming call. When the mobile device manages obtaining a voicemail from the maker of the incoming call, the voicemail is originally obtained and is stored locally, without use of centralized carrier resources at the time of recording the voicemail, and the mobile device can also play the recorded voicemail at any time without use of the centralized carrier resources.

20 Claims, 7 Drawing Sheets

Related U.S. Application Data continuation-in-part of application No. 14/991,750, filed on Jan. 8, 2016, now abandoned, which is a continuation of application No. 13/907,585, filed on May 31, 2013, now abandoned.

(60) Provisional application No. 61/654,693, filed on Jun. 1, 2012.

(51) Int. Cl.
*H04M 3/537* (2006.01)
*H04M 1/663* (2006.01)
*H04M 1/65* (2006.01)

MOBILE-DEVICE-BASED CARRIER VOICEMAIL REDUCTION

CROSS-REFERENCE TO RELATED APPLICATIONS

This application is a continuation of U.S. patent application Ser. No. 15/968,729 filed May 1, 2018, which is a continuation-in-part of U.S. patent application Ser. No. 14/991,750 filed Jan. 8, 2016, which is a continuation of U.S. patent application Ser. No. 13/907,585 filed May 31, 2013, which claims the benefit of U.S. Provisional Application No. 61/654,693, filed Jun. 1, 2012.

BACKGROUND OF THE INVENTION

1. Field of the Invention

The present invention relates to mobile devices having phoning capabilities, and more particularly to mobile-device-implemented systems and methods for reducing carrier-based voicemail-related demands on carrier resources.

2. Background and Related Art

There are a variety of mobile devices having phoning capabilities in use today, including but not necessarily limited to smart phones, some tablet computers, and standard cell phones. While the capabilities of such devices have been growing over time, such devices continue to be limited in certain regards, especially in the ways in which such devices are able to handle incoming calls.

Traditional mobile carrier voicemail systems are laden with processes that result in inefficient use of carrier resources. Carrier voicemail systems are centralized and a result of centralization is that delivery of voicemails to users requires the use of additional carrier resources in the stages of either providing access to the stored voicemails on the carrier system or of providing shipping of voicemails to the end users. Furthermore, traditional carrier voicemail systems are limited in that they are forced-engagement systems that are engaged by default to prevent ongoing ring situations that could deplete mobile phone batteries or cause other problems in the event of an unanswered incoming call.

Traditional mobile carrier voicemail systems are accordingly tasked with handling many events and processes as a result of the centralized system and forced engagement. The carrier systems are first engaged and resources used when the voicemail is received from the incoming call. The carrier systems are further engaged and resources used with respect to storing of received voicemails. The carrier systems are further engaged and resources used when the recipient attempts to retrieve the received voicemail. In the past, when the carriers' customers had limited calling plans, at least calls to the systems to retrieve voicemails resulted in use of the customers' limited minute resources. Today, many customers have unlimited calling plans, so mobile carriers are left with the burden of paying for all airtime used by customers to access the centralized voicemail systems.

FIG. 1 illustrates a screen shot showing the limited options provided by traditional mobile devices upon receipt of an incoming call. Upon receipt of the incoming call, the user of the mobile device is forced to select between taking the call (whereupon the call is connected at the mobile device), rejecting the call without sending a text message (whereupon forced engagement with the mobile carrier centralized voicemail system occurs, and a maker of the incoming call can leave a message with the centralized system), or rejecting the call and sending the caller a text message (whereupon forced engagement also occurs, though the user of the device is also provided with an option to send the caller a text message, such as explaining a reason for current availability). Accordingly, in traditional environments, the only options for management of an incoming call at a mobile device are to answer the call or to force engagement with the mobile carrier centralized voicemail system.

BRIEF SUMMARY OF THE INVENTION

Implementation of the invention provides systems and methods for reduction of use of centralized mobile carrier voicemail resources by way of mobile-device-implemented voicemail recording, playback, and management without involving the centralized mobile carrier voicemail resources. Accordingly, implementation of the invention provides systems and methods for time-of-call optional engagement with the mobile carrier centralized voicemail system or device-managed voicemail operations. In this way, while traditional centralized mobile carrier voicemail systems remain available to the user of the mobile device, users of the device are able to initially reduce demand on the centralized mobile carrier voicemail systems when obtaining a voicemail from the maker of an incoming call is initially managed by and occurs in a decentralized fashion at the mobile device.

Furthermore, demand on the centralized mobile carrier voicemail system is further reduced at the voicemail storage stage. Because voicemails managed by and recorded at the mobile device are originally and natively stored at the mobile device, the centralized storage resources of the mobile carrier voicemail system are relieved from the burden of storing the voicemail either temporarily or indefinitely. Accordingly, mobile carriers can reduce the costs associated with acquiring and storing voicemails in a centralized fashion when decentralized voicemail management occurs at the mobile device and when the centralized mobile carrier voicemail system is only optionally engaged by the user of the mobile device.

Additionally, demand on the centralized mobile carrier voicemail system is also reduced at the voicemail consumption stage. Because voicemails managed by and recorded at the mobile device are originally obtained at and stored by the mobile device, the user of the mobile device is able to access the voicemails without any utilization of centralized mobile carrier voicemail systems. Accordingly, the user of the mobile device need not dial into the centralized mobile carrier voicemail system (thereby temporarily occupying one of the mobile carrier trunk lines). Similarly, the mobile carrier also need not provide robotic audio prompts to assist the user in navigating the centralized voicemail system. In addition, in systems where the mobile carrier centralized voicemail system is configured to automatically send data files containing received voicemails to the mobile device (e.g., visual voicemail), the mobile carrier system is relieved of the data burden of transmitting such data files to the mobile device. The storage and other resource benefits to the mobile carrier are only heightened with respect to prior instances where voicemails are consumed multiple times while traditionally remaining stored on mobile carrier voicemail systems, with storage space being used as long as the voicemail is retained, and with carrier lines being used each time the voicemail is accessed.

According to implementation of the invention, each mobile device participates in the activities that pertain to the voicemails for that mobile device. These activities may occur, via optional engagement, without utilizing mobile carrier centralized voicemail resources. Accordingly, phone call methods for accessing voicemails are eliminated completely with respect to voicemails obtained by decentralized methods. Similarly, even the costs associated with shipping voicemails as data to mobile devices (e.g., visual voicemail) are eliminated by implementing the invention to move away from forced engagement of centralized mobile carrier voicemail resources.

In some instances, the centralized mobile carrier voicemail systems and resources, though minimized, may remain and be utilized via optional engagement. For example, the user of the mobile device may opt to engage the centralized mobile carrier voicemail system. As another example, the centralized mobile carrier voicemail system may continue to serve in instances where the mobile device is out-of-network or turned off, and is therefore unable to serve its role in decentralized management of incoming voicemail collection. As still another example, the centralized mobile carrier voicemail system may continue to serve as a short-term repository of stored voicemails, even when original voicemail collection occurs at the mobile device. Accordingly, the mobile device may optionally transfer a received voicemail (e.g., via a data connection) to the centralized mobile carrier voicemail system to permit temporary access and/or for protection against destruction at the mobile device. Storage of voicemails may also be managed by the user of the mobile device, such as transfer of voicemails to other local resources via a wired or wireless (e.g. Wi-Fi/Bluetooth) connection.

The decentralized, optional-engagement nature of implementation of the invention minimizes usage of centralized resources in collecting, storing, and providing access to voicemails even when no action is taken by the user of the mobile device on receipt of an incoming call. Instead of the forced-engagement nature of traditional systems whereby the centralized system answers the incoming call and provides an opportunity to leave a voicemail at the centralized system after a certain number of rings at the mobile device, the optional-engagement implementation prevents engagement of the centralized system except in instances where the mobile device is unavailable or instances where the user of the mobile device opts to engage the centralized system. Instead, the mobile device is adapted to default to answer an incoming call and record a voicemail at the mobile device (decentralized) in the event the user fails to select a voicemail or other call management option within a certain amount of time or number of rings. Accordingly, in instances where user input is lacking, the system will default to decentralized collection, storage, and management of voicemails over centralized collection, storage, and access of voicemails.

According to an implementation of the invention, a device capable of providing telephonic capability includes one of software, hardware, and a combination of software and hardware configured to receive an incoming telephone call, notify a user of the device of the incoming call, and provide the user of the device with a plurality of options for managing the incoming call, the plurality of options for managing the incoming call. The options include an option to divert the incoming call to a centralized voicemail system operated by a mobile carrier, an option to answer the incoming call and immediately allow the user of the device to participate in a telephone call with a maker of the incoming call, and an option to cause the device to answer the incoming call and to manage the answered incoming call without immediately connecting the user of the device to participate in a telephone call with the maker of the incoming call.

The plurality of options for managing the incoming call may include an option to divert the incoming call to the centralized voicemail system operated by the mobile carrier without sending a text message to the maker of the incoming call and an option to divert the incoming call to the centralized voicemail system operated by the mobile carrier and to compose a text message to the maker of the incoming call. The options may also include an option to answer the incoming call at the device, play a greeting to the maker of the incoming call asking the maker of the incoming call to leave a message, and locally record a voicemail at the device without utilizing the centralized voicemail system operated by the mobile carrier and without further participation of the user of the device. The options may also include an option to answer the incoming call at the device, play a greeting to the maker of the incoming call asking the maker of the incoming call to leave a message, locally record a voicemail at the device without utilizing the centralized voicemail system operated by the mobile carrier, and screen the voicemail in real time as it is left by the maker of the incoming call. The options may also include an option to answer the incoming call at the device and play a greeting to the maker of the incoming call asking the maker to please hold. The options may also include an option to answer the incoming call at the device and immediately disconnect the incoming call.

When the option to answer the incoming call at the device, play a greeting, and locally record a voicemail without further participation from the user is selected, the device may provide an option to review the recorded voicemail to the user of the device. When the option to answer the incoming call at the device, play a greeting, and locally record a voicemail, and screen the voicemail in real time is selected, the device may provide an option to cease screening the voicemail and allow the maker to keep leaving the voicemail, an option to connect the user of the device to the maker to participate in a telephone call, and an option to immediately disconnect the incoming call. When the option to answer the incoming call at the device, play a greeting, and locally record a voicemail, and screen the voicemail in real time is selected, the device may activate a speaker of the device without activating a microphone of the device, whereby the speaker plays a message being left by the maker of the incoming call in real time.

When the option to answer the incoming call and play a greeting asking the maker to please hold is selected, the device may provide an option to connect the user of the device to the maker to participate in a telephone call. When the option to answer the incoming call and play a greeting asking the maker to please hold is selected, the device may play a greeting to the maker of the incoming call over a telephonic connection. When the option to answer the incoming call and immediately disconnect the incoming call is selected, the device may provide an option to always manage future calls from the maker in the same fashion, and an option to not always manage future calls from the maker in the same fashion. When the option to answer the incoming call and immediately disconnect the incoming call is selected, the device may answer the incoming call and disconnect the incoming call without an opportunity being provided to the maker of the incoming call to leave a voicemail message locally or on the centralized voicemail system.

According to another implementation of the invention, a device capable of providing telephonic capability and of reducing an operating load of a centralized mobile carrier voicemail system includes one of software, hardware, and a combination of software and hardware configured to receive an incoming telephone call, notify a user of the device of the incoming call, and provide the user with an opportunity to either optionally engage the centralized mobile carrier voicemail system to manage the incoming call or alternatively to manage the incoming call locally at the device by providing the user of the device with a plurality of options for managing the incoming call, the plurality of options for managing the incoming call. The plurality of options includes an option to divert the incoming call to the centralized mobile carrier voicemail system, an option to answer the incoming call and immediately allow the user of the device to participate in a telephone call with a maker of the incoming call, and an option to cause the device to answer the incoming call and to manage the answered incoming call without immediately and fully connecting the user of the device to participate in a telephone call with the maker of the incoming call.

The plurality of options for managing the incoming call may include an option to divert the incoming call to the centralized mobile carrier voicemail system without sending a text message to the maker of the incoming call and an option to divert the incoming call to the centralized mobile carrier voicemail system and to compose a text message to the maker of the incoming call. The plurality of options for managing the incoming call may include an option to answer the incoming call at the device, play a greeting to the maker of the incoming call asking the maker of the incoming call to leave a message, and locally record a voicemail on a local storage media of the device without utilizing the centralized mobile carrier voicemail system and without further participation of the user of the device. The plurality of options for managing the incoming call may include an option to answer the incoming call at the device, play a greeting to the maker of the incoming call asking the maker of the incoming call to leave a message, locally record a voicemail at the device without utilizing the centralized voicemail system operated by the mobile carrier, and screen the voicemail in real time as it is left by the maker of the incoming call. The plurality of options for managing the incoming call may include an option to answer the incoming call at the device and play a greeting to the maker of the incoming call asking the maker to please hold. The plurality of options for managing the incoming call may include an option to answer the incoming call at the device and immediately disconnect the incoming call.

When the option to answer the incoming call at the device, play a greeting, and locally record a voicemail without further participation from the user is selected, the device may provide an option to review the recorded voicemail to the user of the device. When the option to answer the incoming call at the device, play a greeting, and locally record a voicemail, and screen the voicemail in real time is selected, the device may provide an option to cease screening the voicemail and allow the maker to keep leaving the voicemail, an option to connect the user of the device to the maker to participate in a telephone call, and an option to immediately disconnect the incoming call. When the option to answer the incoming call at the device, play a greeting, and locally record a voicemail, and screen the voicemail in real time is selected, the device may activate a speaker of the device without activating a microphone of the device, whereby the speaker plays a message being left by the maker of the incoming call in real time.

When the option to answer the incoming call and play a greeting asking the maker to please hold, the device may provide an option to connect the user of the device to the maker to participate in a telephone call. When the option to answer the incoming call and play a greeting asking the maker to please hold is selected, the device may play a greeting to the maker of the incoming call over a telephonic connection. When the option to answer the incoming call and immediately disconnect the incoming call is selected, the device may provide an option to always manage future calls from the maker in the same fashion, and an option to not always manage future calls from the maker in the same fashion. When the option to answer the incoming call and immediately disconnect the incoming call is selected, the device may answer the incoming call and disconnect the incoming call without an opportunity being provided to the maker of the incoming call to leave a voicemail message locally or on the centralized voicemail system.

According to another implementation of the invention, a device capable of providing telephonic capability and of reducing an operating load of a centralized mobile carrier voicemail system includes one of software, hardware, and a combination of software and hardware configured to receive an incoming telephone call, notify a user of the device of the incoming call, and provide the user with an opportunity to either optionally engage the centralized mobile carrier voicemail system to manage the incoming call or alternatively to manage the incoming call locally at the device by providing the user of the device with a plurality of options for managing the incoming call, the plurality of options for managing the incoming call. The plurality of options includes an option to divert the incoming call to the centralized mobile carrier voicemail system without sending a text message to the maker of the incoming call, an option to divert the incoming call to the centralized mobile carrier voicemail system and to compose a text message to the maker of the incoming call, and an option to answer the incoming call and immediately allow the user of the device to participate in a telephone call with a maker of the incoming call via a speaker and a microphone of the device. The plurality of options also includes an option to answer the incoming call at the device without activating a speaker of the device, play a greeting to the maker of the incoming call asking the maker of the incoming call to leave a message, and locally record a voicemail on a local storage media of the device without utilizing the centralized mobile carrier voicemail system and without further participation of the user of the device. The plurality of options also includes an option to answer the incoming call at the device, play a greeting to the maker of the incoming call asking the maker of the incoming call to leave a message, locally record a voicemail at the device without utilizing the centralized voicemail system operated by the mobile carrier, and screen the voicemail in real time as it is left by the maker of the incoming call using a speaker of the device. The plurality of options also includes an option to answer the incoming call at the device and play a greeting to the maker of the incoming call asking the maker to please hold. The plurality of options also includes an option to answer the incoming call at the device and immediately disconnect the incoming call without activating a speaker and a microphone of the device.

The device is capable of immediately playing a voicemail left at the device without connecting to the centralized mobile carrier voicemail system and without receiving the voicemail from the centralized mobile carrier voicemail system because the voicemail was originally recorded at the device by the device as the voicemail was left by the maker of the incoming call.

The system may be implemented in software and/or hardware, and may be pre-installed on a mobile device or may be installed after the fact. The system may be installed entirely on the mobile device, or remote resources may be utilized to provide at least certain functions of the system.

According to implementation of the invention, systems, methods, and non-transitory computer-readable media provide features of implementations of the invention operating on a device capable of providing phoning capability.

BRIEF DESCRIPTION OF THE SEVERAL VIEWS OF THE DRAWINGS

The objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described and explained with additional specificity and detail through the use of the accompanying drawings in which:

DETAILED DESCRIPTION OF THE INVENTION

Figure 1:
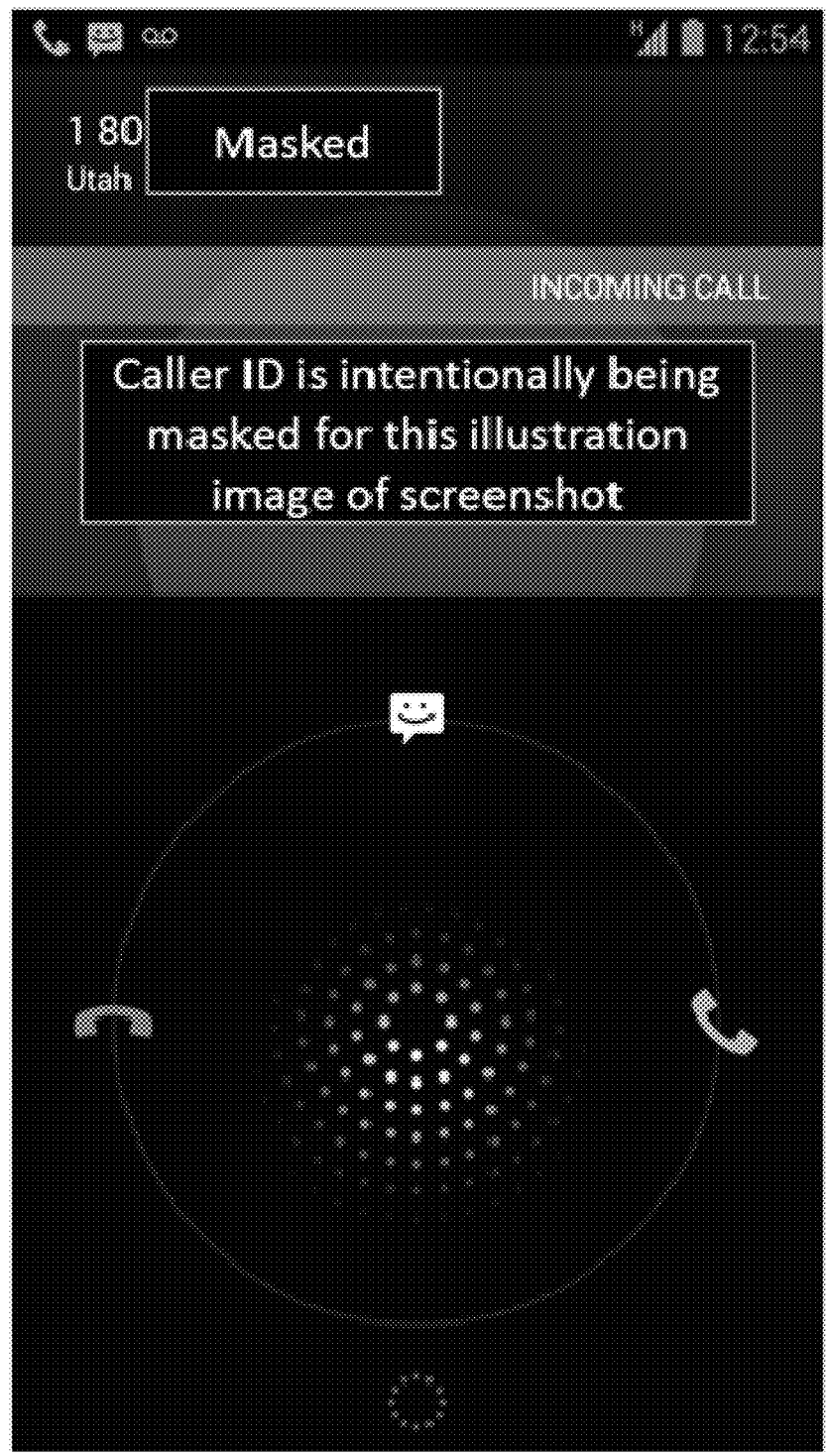
FIG. 1 illustrates a representative display of a mobile device operating in accordance with prior art methods for handling an incoming telephone call.

A description of embodiments of the present invention will now be given with reference to the Figures. It is expected that the present invention may take many other forms and shapes, hence the following disclosure is intended to be illustrative and not limiting, and the scope of the invention should be determined by reference to the appended claims.

Embodiments of the invention provide systems and methods for reduction of use of centralized mobile carrier voicemail resources by way of mobile-device-implemented voicemail recording, playback, and management without involving the centralized mobile carrier voicemail resources. Accordingly, embodiments of the invention provides systems and methods for time-of-call optional engagement with the mobile carrier centralized voicemail system or device-managed voicemail operations. In this way, while traditional centralized mobile carrier voicemail systems remain available to the user of the mobile device, users of the device are able to initially reduce demand on the centralized mobile carrier voicemail systems when obtaining a voicemail from the maker of an incoming call is initially managed by and occurs in a decentralized fashion at the mobile device.

Furthermore, demand on the centralized mobile carrier voicemail system is further reduced at the voicemail storage stage. Because voicemails managed by and recorded at the mobile device are originally and natively stored at the mobile device, the centralized storage resources of the mobile carrier voicemail system are relieved from the burden of storing the voicemail either temporarily or indefinitely. Accordingly, mobile carriers can reduce the costs associated with acquiring and storing voicemails in a centralized fashion when decentralized voicemail management occurs at the mobile device and when the centralized mobile carrier voicemail system is only optionally engaged by the user of the mobile device.

Additionally, demand on the centralized mobile carrier voicemail system is also reduced at the voicemail consumption stage. Because voicemails managed by and recorded at the mobile device are originally obtained at and stored by the mobile device, the user of the mobile device is able to access the voicemails without any utilization of centralized mobile carrier voicemail systems. Accordingly, the user of the mobile device need not dial into the centralized mobile carrier voicemail system (thereby temporarily occupying one of the mobile carrier trunk lines). Similarly, the mobile carrier also need not provide robotic audio prompts to assist the user in navigating the centralized voicemail system. In addition, in systems where the mobile carrier centralized voicemail system is configured to automatically send data files containing received voicemails to the mobile device (e.g., visual voicemail), the mobile carrier system is relieved of the data burden of transmitting such data files to the mobile device. The storage and other resource benefits to the mobile carrier are only heightened with respect to prior instances where voicemails are consumed multiple times while traditionally remaining stored on mobile carrier voicemail systems, with storage space being used as long as the voicemail is retained, and with carrier lines being used each time the voicemail is accessed.

According to embodiments of the invention, each mobile device participates in the activities that pertain to the voicemails for that mobile device. These activities may occur, via optional engagement, without utilizing mobile carrier centralized voicemail resources. Accordingly, phone call methods for accessing voicemails are eliminated completely with respect to voicemails obtained by decentralized methods. Similarly, even the costs associated with shipping voicemails as data to mobile devices (e.g., visual voicemail) are eliminated by implementing the invention to move away from forced engagement of centralized mobile carrier voicemail resources.

In some instances, the centralized mobile carrier voicemail systems and resources, though minimized, may remain and be utilized via optional engagement. For example, the user of the mobile device may opt to engage the centralized mobile carrier voicemail system. As another example, the centralized mobile carrier voicemail system may continue to serve in instances where the mobile device is out-of-network or turned off, and is therefore unable to serve its role in decentralized management of incoming voicemail collection. As still another example, the centralized mobile carrier voicemail system may continue to serve as a short-term repository of stored voicemails, even when original voicemail collection occurs at the mobile device. Accordingly, the mobile device may optionally transfer a received voicemail (e.g., via a data connection) to the centralized mobile carrier voicemail system to permit temporary access and/or for protection against destruction at the mobile device. Storage of voicemails may also be managed by the user of the mobile device, such as transfer of voicemails to other local resources via a wired or wireless (e.g. Wi-Fi/Bluetooth) connection.

The decentralized, optional-engagement nature of embodiments of the invention minimizes usage of centralized resources in collecting, storing, and providing access to voicemails even when no action is taken by the user of the mobile device on receipt of an incoming call. Instead of the forced-engagement nature of traditional systems whereby the centralized system answers the incoming call and provides an opportunity to leave a voicemail at the centralized system after a certain number of rings at the mobile device, the optional-engagement embodiments prevents engagement of the centralized system except in instances where the mobile device is unavailable or instances where the user of the mobile device opts to engage the centralized system. Instead, the mobile device is adapted to default to answer an incoming call and record a voicemail at the mobile device (decentralized) in the event the user fails to select a voicemail or other call management option within a certain amount of time or number of rings. Accordingly, in instances where user input is lacking, the system will default to decentralized collection, storage, and management of voicemails over centralized collection, storage, and access of voicemails.

According to an embodiments of the invention, a device capable of providing telephonic capability includes one of software, hardware, and a combination of software and hardware configured to receive an incoming telephone call, notify a user of the device of the incoming call, and provide the user of the device with a plurality of options for managing the incoming call, the plurality of options for managing the incoming call. The options include an option to divert the incoming call to a centralized voicemail system operated by a mobile carrier, an option to answer the incoming call and immediately allow the user of the device to participate in a telephone call with a maker of the incoming call, and an option to cause the device to answer the incoming call and to manage the answered incoming call without immediately connecting the user of the device to participate in a telephone call with the maker of the incoming call.

The plurality of options for managing the incoming call may include an option to divert the incoming call to the centralized voicemail system operated by the mobile carrier without sending a text message to the maker of the incoming call and an option to divert the incoming call to the centralized voicemail system operated by the mobile carrier and to compose a text message to the maker of the incoming call. The options may also include an option to answer the incoming call at the device, play a greeting to the maker of the incoming call asking the maker of the incoming call to leave a message, and locally record a voicemail at the device without utilizing the centralized voicemail system operated by the mobile carrier and without further participation of the user of the device. The options may also include an option to answer the incoming call at the device, play a greeting to the maker of the incoming call asking the maker of the incoming call to leave a message, locally record a voicemail at the device without utilizing the centralized voicemail system operated by the mobile carrier, and screen the voicemail in real time as it is left by the maker of the incoming call. The options may also include an option to answer the incoming call at the device and play a greeting to the maker of the incoming call asking the maker to please hold. The options may also include an option to answer the incoming call at the device and immediately disconnect the incoming call.

When the option to answer the incoming call at the device, play a greeting, and locally record a voicemail without further participation from the user is selected, the device may provide an option to review the recorded voicemail to the user of the device. When the option to answer the incoming call at the device, play a greeting, and locally record a voicemail, and screen the voicemail in real time is selected, the device may provide an option to cease screening the voicemail and allow the maker to keep leaving the voicemail, an option to connect the user of the device to the maker to participate in a telephone call, and an option to immediately disconnect the incoming call. When the option to answer the incoming call at the device, play a greeting, and locally record a voicemail, and screen the voicemail in real time is selected, the device may activate a speaker of the device without activating a microphone of the device, whereby the speaker plays a message being left by the maker of the incoming call in real time.

When the option to answer the incoming call and play a greeting asking the maker to please hold is selected, the device may provide an option to connect the user of the device to the maker to participate in a telephone call. When the option to answer the incoming call and play a greeting asking the maker to please hold is selected, the device may play a greeting to the maker of the incoming call over a telephonic connection. When the option to answer the incoming call and immediately disconnect the incoming call is selected, the device may provide an option to always manage future calls from the maker in the same fashion, and an option to not always manage future calls from the maker in the same fashion. When the option to answer the incoming call and immediately disconnect the incoming call is selected, the device may answer the incoming call and disconnect the incoming call without an opportunity being provided to the maker of the incoming call to leave a voicemail message locally or on the centralized voicemail system.

According to another embodiments of the invention, a device capable of providing telephonic capability and of reducing an operating load of a centralized mobile carrier voicemail system includes one of software, hardware, and a combination of software and hardware configured to receive an incoming telephone call, notify a user of the device of the incoming call, and provide the user with an opportunity to either optionally engage the centralized mobile carrier voicemail system to manage the incoming call or alternatively to manage the incoming call locally at the device by providing the user of the device with a plurality of options for managing the incoming call, the plurality of options for managing the incoming call. The plurality of options includes an option to divert the incoming call to the centralized mobile carrier voicemail system, an option to answer the incoming call and immediately allow the user of the device to participate in a telephone call with a maker of the incoming call, and an option to cause the device to answer the incoming call and to manage the answered incoming call without immediately and fully connecting the user of the device to participate in a telephone call with the maker of the incoming call.

The plurality of options for managing the incoming call may include an option to divert the incoming call to the centralized mobile carrier voicemail system without sending a text message to the maker of the incoming call and an option to divert the incoming call to the centralized mobile carrier voicemail system and to compose a text message to the maker of the incoming call. The plurality of options for managing the incoming call may include an option to answer the incoming call at the device, play a greeting to the maker of the incoming call asking the maker of the incoming call to leave a message, and locally record a voicemail on a local storage media of the device without utilizing the centralized mobile carrier voicemail system and without further participation of the user of the device. The plurality of options for managing the incoming call may include an option to answer the incoming call at the device, play a greeting to the maker of the incoming call asking the maker of the incoming call to leave a message, locally record a voicemail at the device without utilizing the centralized voicemail system operated by the mobile carrier, and screen the voicemail in real time as it is left by the maker of the incoming call. The plurality of options for managing the incoming call may include an option to answer the incoming call at the device and play a greeting to the maker of the incoming call asking the maker to please hold. The plurality of options for managing the incoming call may include an option to answer the incoming call at the device and immediately disconnect the incoming call.

When the option to answer the incoming call at the device, play a greeting, and locally record a voicemail without further participation from the user is selected, the device may provide an option to review the recorded voicemail to the user of the device. When the option to answer the incoming call at the device, play a greeting, and locally record a voicemail, and screen the voicemail in real time is selected, the device may provide an option to cease screening the voicemail and allow the maker to keep leaving the voicemail, an option to connect the user of the device to the maker to participate in a telephone call, and an option to immediately disconnect the incoming call. When the option to answer the incoming call at the device, play a greeting, and locally record a voicemail, and screen the voicemail in real time is selected, the device may activate a speaker of the device without activating a microphone of the device, whereby the speaker plays a message being left by the maker of the incoming call in real time.

When the option to answer the incoming call and play a greeting asking the maker to please hold, the device may provide an option to connect the user of the device to the maker to participate in a telephone call. When the option to answer the incoming call and play a greeting asking the maker to please hold is selected, the device may play a greeting to the maker of the incoming call over a telephonic connection. When the option to answer the incoming call and immediately disconnect the incoming call is selected, the device may provide an option to always manage future calls from the maker in the same fashion, and an option to not always manage future calls from the maker in the same fashion. When the option to answer the incoming call and immediately disconnect the incoming call is selected, the device may answer the incoming call and disconnect the incoming call without an opportunity being provided to the maker of the incoming call to leave a voicemail message locally or on the centralized voicemail system.

According to another embodiments of the invention, a device capable of providing telephonic capability and of reducing an operating load of a centralized mobile carrier voicemail system includes one of software, hardware, and a combination of software and hardware configured to receive an incoming telephone call, notify a user of the device of the incoming call, and provide the user with an opportunity to either optionally engage the centralized mobile carrier voicemail system to manage the incoming call or alternatively to manage the incoming call locally at the device by providing the user of the device with a plurality of options for managing the incoming call, the plurality of options for managing the incoming call. The plurality of options includes an option to divert the incoming call to the centralized mobile carrier voicemail system without sending a text message to the maker of the incoming call, an option to divert the incoming call to the centralized mobile carrier voicemail system and to compose a text message to the maker of the incoming call, and an option to answer the incoming call and immediately allow the user of the device to participate in a telephone call with a maker of the incoming call via a speaker and a microphone of the device. The plurality of options also includes an option to answer the incoming call at the device without activating a speaker of the device, play a greeting to the maker of the incoming call asking the maker of the incoming call to leave a message, and locally record a voicemail on a local storage media of the device without utilizing the centralized mobile carrier voicemail system and without further participation of the user of the device. The plurality of options also includes an option to answer the incoming call at the device, play a greeting to the maker of the incoming call asking the maker of the incoming call to leave a message, locally record a voicemail at the device without utilizing the centralized voicemail system operated by the mobile carrier, and screen the voicemail in real time as it is left by the maker of the incoming call using a speaker of the device. The plurality of options also includes an option to answer the incoming call at the device and play a greeting to the maker of the incoming call asking the maker to please hold. The plurality of options also includes an option to answer the incoming call at the device and immediately disconnect the incoming call without activating a speaker and a microphone of the device.

The device is capable of immediately playing a voicemail left at the device without connecting to the centralized mobile carrier voicemail system and without receiving the voicemail from the centralized mobile carrier voicemail system because the voicemail was originally recorded at the device by the device as the voicemail was left by the maker of the incoming call.

The system may be implemented in software and/or hardware, and may be pre-installed on a mobile device or may be installed after the fact. The system may be installed entirely on the mobile device, or remote resources may be utilized to provide at least certain functions of the system.

According to embodiments of the invention, systems, methods, and non-transitory computer-readable media provide features of embodiments of the invention operating on a device capable of providing phoning capability.

Figure 2:
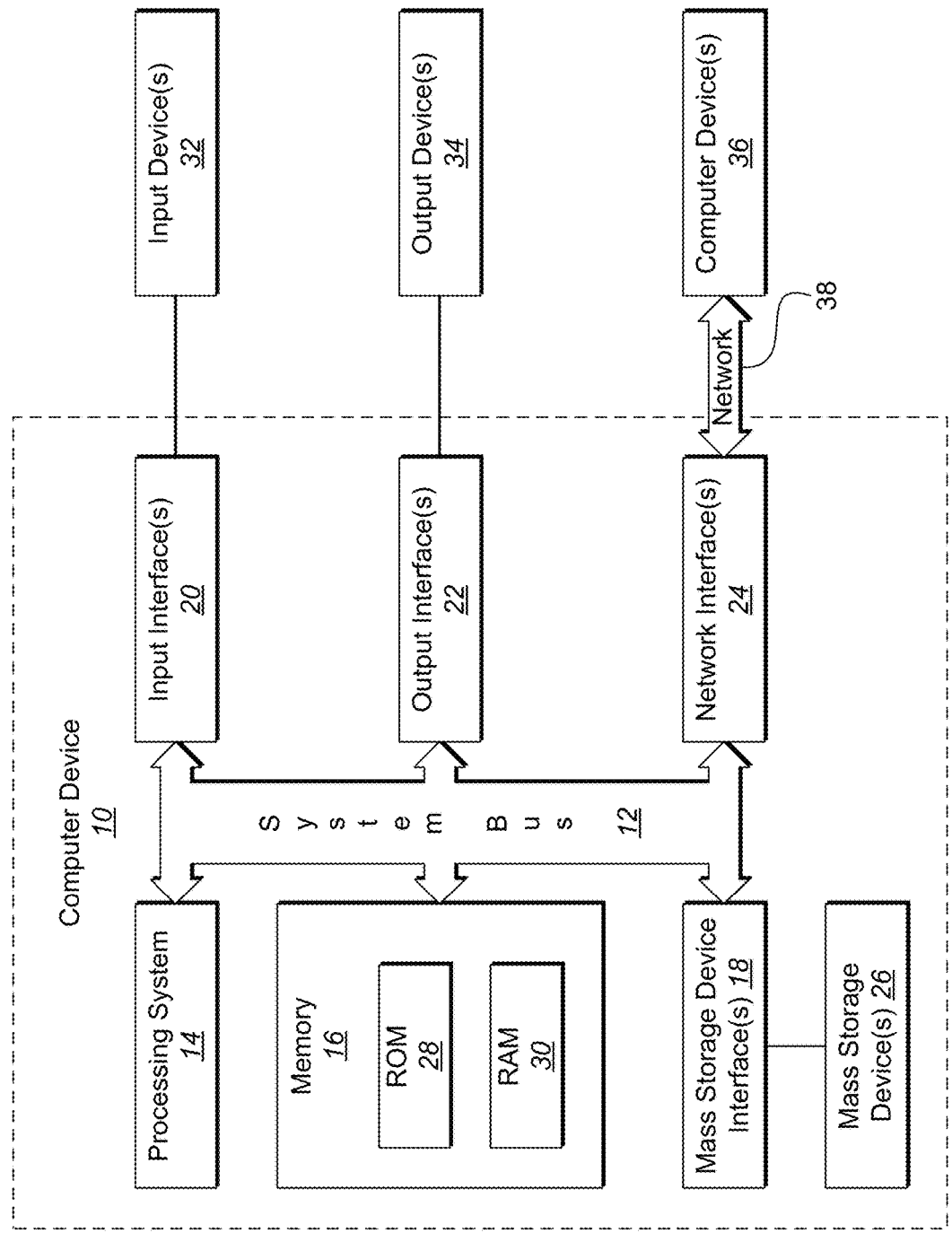
FIG. 2 shows a representative computer device for use with embodiments of the invention.

FIG. 2 and the corresponding discussion are intended to provide a general description of a suitable operating environment in which embodiments of the invention may be implemented. One skilled in the art will appreciate that embodiments of the invention may be practiced by one or more computing devices and in a variety of system configurations, including in a networked configuration. However, while the methods and processes of the present invention have proven to be particularly useful in association with a system comprising a general purpose computer, embodiments of the present invention include utilization of the methods and processes in a variety of environments, including embedded systems with general purpose processing units, digital/media signal processors (DSP/MSP), application specific integrated circuits (ASIC), stand alone electronic devices, and other such electronic environments.

Embodiments of the present invention embrace one or more computer-readable media, wherein each medium may be configured to include or includes thereon data or computer executable instructions for manipulating data. The computer executable instructions include data structures, objects, programs, routines, or other program modules that may be accessed by a processing system, such as one associated with a general-purpose computer capable of performing various different functions or one associated with a special-purpose computer capable of performing a limited number of functions. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer-readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system. While embodiments of the invention embrace the use of all types of computer-readable media, certain embodiments as recited in the claims may be limited to the use of tangible, non-transitory computer-readable media, and the phrases "tangible computer-readable medium" and "non-transitory computer-readable medium" (or plural variations) used herein are intended to exclude transitory propagating signals per se.

With reference to FIG. 2, a representative system for implementing embodiments of the invention includes computer device 10, which may be a general-purpose or special-purpose computer or any of a variety of consumer electronic devices. For example, computer device 10 may be a personal computer, a notebook computer, a netbook, a personal digital assistant ("PDA") or other hand-held device, a workstation, a minicomputer, a mainframe, a supercomputer, a multi-processor system, a network computer, a processor-based consumer electronic device, or the like.

Computer device 10 includes system bus 12, which may be configured to connect various components thereof and enables data to be exchanged between two or more components. System bus 12 may include one of a variety of bus structures including a memory bus or memory controller, a peripheral bus, or a local bus that uses any of a variety of bus architectures. Typical components connected by system bus 12 include processing system 14 and memory 16. Other components may include one or more mass storage device interfaces 18, input interfaces 20, output interfaces 22, and/or network interfaces 24, each of which will be discussed below.

Processing system 14 includes one or more processors, such as a central processor and optionally one or more other processors designed to perform a particular function or task. It is typically processing system 14 that executes the instructions provided on computer-readable media, such as on memory 16, a magnetic hard disk, a removable magnetic disk, a magnetic cassette, an optical disk, or from a communication connection, which may also be viewed as a computer-readable medium.

Memory 16 includes one or more computer-readable media that may be configured to include or includes thereon data or instructions for manipulating data, and may be accessed by processing system 14 through system bus 12. Memory 16 may include, for example, ROM 28, used to permanently store information, and/or RAM 30, used to temporarily store information. ROM 28 may include a basic input/output system ("BIOS") having one or more routines that are used to establish communication, such as during start-up of computer device 10. RAM 30 may include one or more program modules, such as one or more operating systems, application programs, and/or program data.

One or more mass storage device interfaces 18 may be used to connect one or more mass storage devices 26 to system bus 12. The mass storage devices 26 may be incorporated into or may be peripheral to computer device 10 and allow computer device 10 to retain large amounts of data. Optionally, one or more of the mass storage devices 26 may be removable from computer device 10. Examples of mass storage devices include hard disk drives, magnetic disk drives, tape drives and optical disk drives. A mass storage device 26 may read from and/or write to a magnetic hard disk, a removable magnetic disk, a magnetic cassette, an optical disk, or another computer-readable medium. Mass storage devices 26 and their corresponding computer-readable media provide nonvolatile storage of data and/or executable instructions that may include one or more program modules such as an operating system, one or more application programs, other program modules, or program data. Such executable instructions are examples of program code means for implementing steps for methods disclosed herein.

One or more input interfaces 20 may be employed to enable a user to enter data and/or instructions to computer device 10 through one or more corresponding input devices 32. Examples of such input devices include a keyboard and alternate input devices, such as a mouse, trackball, light pen, stylus, or other pointing device, a microphone, a joystick, a game pad, a satellite dish, a scanner, a camcorder, a digital camera, and the like. Similarly, examples of input interfaces 20 that may be used to connect the input devices 32 to the system bus 12 include a serial port, a parallel port, a game port, a universal serial bus ("USB"), an integrated circuit, a firewire (IEEE 1394), or another interface. For example, in some embodiments input interface 20 includes an application specific integrated circuit (ASIC) that is designed for a particular application. In a further embodiment, the ASIC is embedded and connects existing circuit building blocks.

One or more output interfaces 22 may be employed to connect one or more corresponding output devices 34 to system bus 12. Examples of output devices include a monitor or display screen, a speaker, a printer, a multi-functional peripheral, and the like. A particular output device 34 may be integrated with or peripheral to computer device 10. Examples of output interfaces include a video adapter, an audio adapter, a parallel port, and the like.

One or more network interfaces 24 enable computer device 10 to exchange information with one or more other local or remote computer devices, illustrated as computer devices 36, via a network 38 that may include hardwired and/or wireless links. Examples of network interfaces include a network adapter for connection to a local area network ("LAN") or a modem, wireless link, or other adapter for connection to a wide area network ("WAN"), such as the Internet. The network 38 may be or may include a cellular network. The network interface 24 may be incorporated with or peripheral to computer device 10. In a networked system, accessible program modules or portions thereof may be stored in a remote memory storage device. Furthermore, in a networked system computer device 10 may participate in a distributed computing environment, where functions or tasks are performed by a plurality of networked computer devices.

Figure 3:
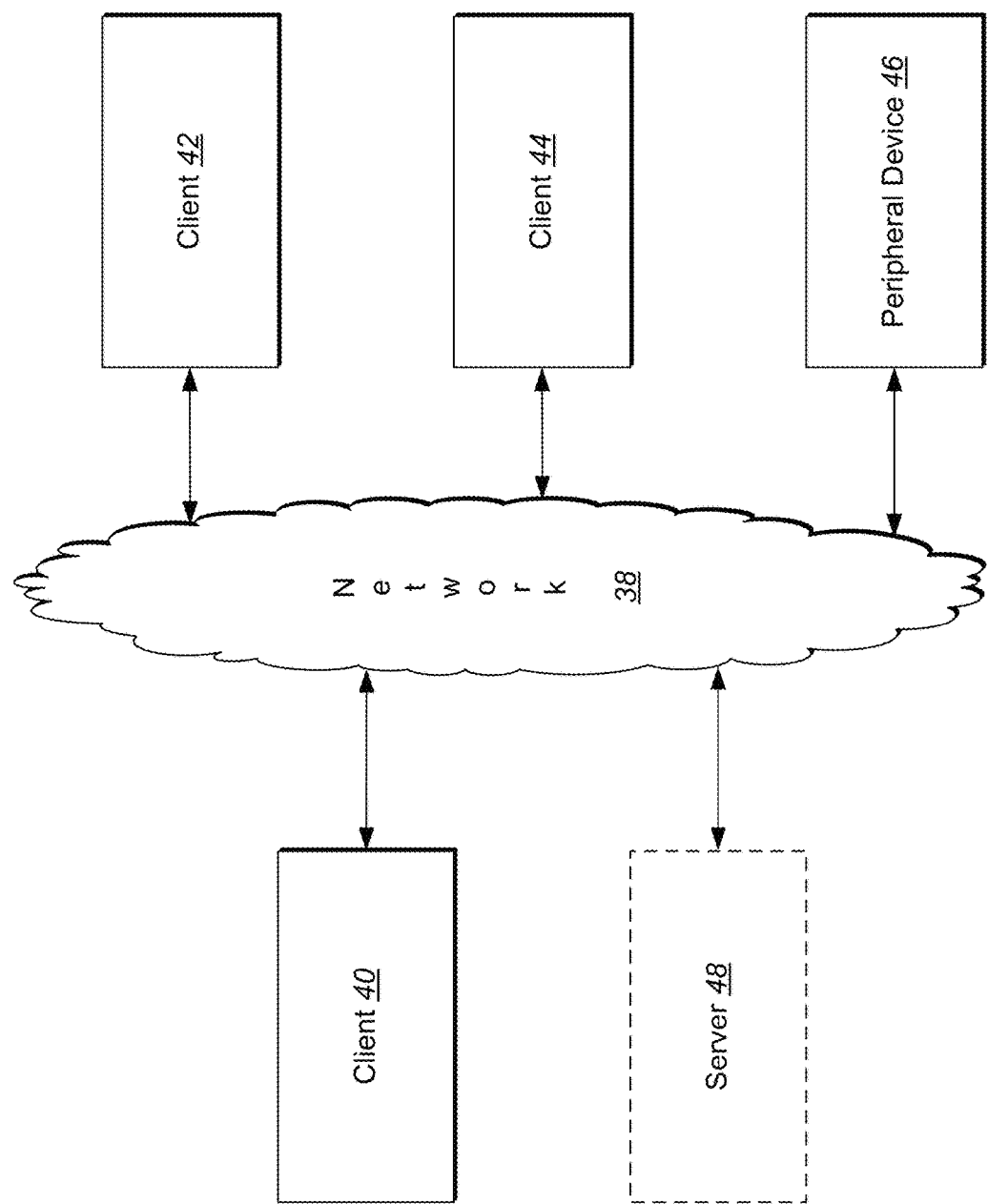
FIG. 3 shows a representative networked computer configuration for use with embodiments of the invention.

Thus, while those skilled in the art will appreciate that embodiments of the present invention may be practiced in a variety of different environments with many types of system configurations, FIG. 2 provides a representative networked system configuration that may be used in association with embodiments of the present invention. The representative system of FIG. 3 includes a computer device, illustrated as client 40, which is connected to one or more other computer devices (illustrated as client 42 and client 44) and one or more peripheral devices 46 across network 38. While FIG. 2 illustrates an embodiment that includes a client 40, two additional clients, client 42 and client 44, one peripheral device 46, and optionally a server 48, connected to network 38, alternative embodiments include more or fewer clients, more than one peripheral device, no peripheral devices 46, no server 48, and/or more than one server 48 connected to network 38. Other embodiments of the present invention include local, networked, or peer-to-peer environments where one or more computer devices may be connected to one or more local or remote peripheral devices. Moreover, embodiments in accordance with the present invention also embrace a single electronic consumer device, wireless networked environments, and/or wide area networked environments, such as the Internet.

Similarly, embodiments of the invention embrace cloud-based architectures where one or more computer functions are performed by remote computer systems and devices at the request of a local computer device. Thus, returning to FIG. 3, the client 40 may be a computer device having a limited set of hardware and/or software resources. Because the client 40 is connected to the network 38, it may be able to access hardware and/or software resources provided across the network 38 by other computer devices and resources, such as client 42, client 44, server 48, or any other resources. The client 40 may access these resources through an access program, such as a web browser, and the results of any computer functions or resources may be delivered through the access program to the user of the client 40. In such configurations, the client 40 may be any type of computer device or electronic device discussed above or known to the world of cloud computing, including traditional desktop and laptop computers, smart phones and other smart devices, tablet computers, or any other device able to provide access to remote computing resources through an access program such as a browser.

As mentioned previously, embodiments of the invention function in conjunction with mobile devices having phoning capabilities. Such devices include, but are not limited to cell phones, smart phones, tablet computers, and the like. Such devices may provide functionality as discussed herein through any combination of hardware and software. Such devices may also provide functionality as discussed herein through hardware and software contained essentially completely on the mobile device. Alternatively, some functionality may be provided in a distributed fashion using remote computing resources, where distribution of computing resources comports with the discussion provided herein.

According to embodiments of the invention, the mobile device includes hardware, software, and/or firmware to provide many of the functions discussed herein. The decentralized voicemail system may be provided with any combination of hardware and software, and may be preinstalled on a mobile device e.g. by the device manufacturer or a cellular provider. Alternatively, the decentralized voicemail system may be installed on the mobile device subsequent to an initial sale of the mobile device. In instances where the decentralized voicemail system is installed on the mobile device subsequent to an initial sale of the device, the decentralized voicemail system may commonly be provided by software that uses existing hardware resources of the mobile device.

Thus, the decentralized voicemail system may be provided as an application or app configured to operate with an operating system of the mobile device. A variety of decentralized voicemail system apps may be provided to function with currently existing operating systems and with new operating systems in the future. Existing operating systems include Apple's iOS, Windows Phone, Bada, BlackBerry OS, Palm OS, Android, Symbian OS, and the like. The decentralized voicemail system apps may be customized to best utilize mobile device resources of each device and operating system, and therefore there are a large variety of specific decentralized voicemail system apps that may be provided in accordance with embodiments of the invention. In embodiments of the invention, the decentralized voicemail system is installed on the mobile device and provides its functions on the mobile device.

Regardless of how the decentralized voicemail system is implemented, the decentralized voicemail system functions to provide functionality not previously available with mobile phoning by providing optional engagement with the centralized mobile carrier voicemail system and defaulting to local voicemail collection, storage, management, and playback. The decentralized voicemail system may run at all times on the mobile device when the mobile device is in communication with the mobile device's network. Alternatively, the decentralized voicemail system may only run when an incoming call is received at the mobile device and when the mobile device's voicemail is accessed. The decentralized voicemail system has access to the mobile device's features (e.g. any combination of hardware and software) that provide the mobile device with phoning capabilities. The decentralized voicemail system acts as an interface between the user of the mobile device and the mobile device's network. Where existing mobile devices provide an interface between the user and the network, the decentralized voicemail system essentially provides an interface between the user and the network, and the decentralized voicemail system handles the incoming telephone call interactions between the mobile device and the network.

Thus, when an incoming telephone call is to be received by the mobile device, and when the mobile device rings, the decentralized voicemail system provides an interface to the user of the mobile device that provides options to the user for handling the incoming telephone call before the telephone call is answered. Such options may include traditional options for answering (and connecting) the incoming call to permit the user to proceed with the call using the mobile device. The options may also include one or more options for traditional, but now optional, engagement of the incoming call by the centralized mobile carrier voicemail system. The options also include one or more options for connecting the incoming call at the mobile device without fully connecting the user of the mobile device to the incoming call.

The decentralized voicemail system operating at the user device may be configured to default to one of the options for connecting the incoming call at the mobile device, such that the centralized mobile carrier voicemail system does not engage the incoming call except in certain limited circumstances. Such limited circumstances may include, for example, optional engagement by the user of the mobile device by way of the user of the mobile device selecting among available options to engage the centralized mobile carrier voicemail system. Such options for optional engagement may mirror currently available options, such as engage centralized voicemail system with text message or engage centralized voicemail system without text message. The limited circumstances in which the centralized voicemail system may be engaged also include circumstances in which the decentralized voicemail system is not connected to the mobile carrier network (e.g., the mobile device is outside of network coverage or is turned off).

Accordingly, if the mobile device is connected to the mobile carrier network and turned on, and the decentralized voicemail system is functioning normally, optional engagement with the centralized mobile carrier voicemail system will only occur when the user takes an affirmative action causing the optional engagement with the centralized mobile carrier network. If no affirmative action is received at the mobile device from the user, the decentralized voicemail system will instead default to one of the one or more options for connecting the incoming call at the mobile device without fully connecting the user of the mobile device to the incoming call. Such options may include options to place the call on hold, options to collect a voicemail at the mobile device without screening the voicemail, options to collect a voicemail at the mobile device while screening the voicemail, and options to connect the call and immediately disconnect (drop) the call without providing an opportunity to leave a voicemail.

The options for managing the incoming call may be provided to the user of the mobile device in a variety of ways. Similarly, the device may receive selection of the desired option in a variety of ways. By way of example, the options may be provided on a screen of the mobile device and the user may provide input selecting an option using a touchscreen capability of the mobile device (e.g. by dragging an option selector to the desired option or by simply touching a desired option). As another example, the options may be provided on a screen of the mobile device and the user may provide input selecting an option using one or more physical buttons of the mobile device. As another example, the options may be provided on a screen of the mobile device and the user may provide input selecting an option using a positioning detection capability of the mobile device (e.g., by tilting, tapping, or otherwise physically manipulating the mobile device). As another example, the options may be provided audibly and the user may provide input selecting an option using one or more voice commands. Where options are provided audibly, the decentralized voicemail system may list all options, or it may simply notify an experienced user of the incoming call and await input from the user, including input requesting elucidation of options in relation to the incoming call. In some embodiments, selection of an option with respect to an incoming call may occur via a single action, while in other embodiments, selection of an option with respect to an incoming call may occur in stepwise fashion using an option tree.

In some embodiments, once a particular option is selected, the decentralized voicemail system may provide the user with further options in relation to the selected option. For example, where the user elects to locally collect a voicemail while screening the voicemail, the decentralized voicemail system may provide the user with options to adjust the volume of the speaker, with an option to discontinue collecting a voicemail and to connect the user to the call (answer the call by activating a microphone of the mobile device), with an option to discontinue collecting a voicemail and to drop the call, or with an option to continue collecting the voicemail but to discontinue screening (deactivate a speaker of the mobile device). If the user selects one of the secondary options, the decentralized voicemail system may provide further options. For example, if the user selects the option to discontinue collecting the voicemail and to drop the call, the decentralized voicemail system may provide the user with an option to automatically connect to and immediately drop future calls from that phone number without further notifying the user that the calls are received (useful with respect to, for example, telemarketing or scam callers). As another example, if the user opts to continue collecting the voicemail, the decentralized voicemail system may provide the user with an option to set a reminder to listen to the recorded voicemail at a later time.

As another example, if the user selects the option to place the call on hold, the decentralized voicemail system may provide the user with an option to connect the call (activate a speaker and a microphone of the mobile device), with an option to drop the call (disconnect with or without a text message), and/or with an option to send the call to local collection of a voicemail. The decentralized voicemail system might also provide the user of the device with one or more options that could provide the maker of the incoming call with a status update (e.g., a notification of an estimated time before the call is taken). In some instances, options may be provided by the user orally.

As another example, if the user selects the option to collect a voicemail at the mobile device without screening the voicemail, the decentralized voicemail system could begin collecting the voicemail (connects to the call without activating a speaker or a microphone of the mobile device, plays a greeting to the maker of the incoming call, and requests a voicemail, then records any message left by the maker of the incoming call), and could immediately present options to the user of the mobile device regarding how the voicemail is to be handled. Alternatively, the decentralized voicemail system could wait until the voicemail is partially or fully recorded before presenting options to the user of the mobile device. In other words, if the maker of the incoming call hangs up or disconnects before any voice mail is left, then no further options might be provided to the user of the mobile device, or the options might be limited. Options presented to the user of the mobile device in such cases may include options for scheduling a reminder to listen to the voicemail, options to begin screening the voicemail as it is being left, and an option to disconnect the call (e.g., if the user needs to use the mobile device to make an emergency call).

Because recording of the voicemail occurs locally, the user may be provided with options that would not be possible without the decentralized voicemail system. Such options may include screening the voicemail in real time. Such options may also include beginning to listen to a voicemail (from the beginning) even while the voicemail is still being left. Another option that may be provided is connecting the user to the call even when a voicemail is being left at the mobile device. Another option that may be provided is disconnecting the call even while a voicemail is being left. Another option that may be provided is transferring a connected call into voicemail (e.g., the user of the device participates in a call with the maker of the incoming call, or even calls someone else, and then after participating in the call to the extent necessary, allows the other party to leave a recording of additional information, while the speaker and microphone of the device are disconnected). Additional options may be offered with respect to effectively blocking calls without leaving any opportunity to the caller to leave a message either on the mobile device or on the centralized mobile carrier voicemail system (the call is answered then immediately dropped). Accordingly, a variety of unique options may be provided that are not available without use of the decentralized voicemail system.

If the user selects the option to connect the call and immediately disconnect or drop the call without providing an opportunity to leave a voicemail, the decentralized voicemail system may do so while optionally providing one or more additional options to the user of the mobile device. The decentralized voicemail system may provide an option to the user to treat further calls from that caller (e.g., using caller ID information) with the same treatment. If that option is selected, the decentralized voicemail system could thereafter immediately connect and drop all future calls from that number. Such a response could be helpful in dealing with a variety of problem callers, such as telemarketers, scam or spam calls, prank callers, and the like. The decentralized voicemail system may allow the user to remove an "always" block calls assignment at any time in the future through decentralized voicemail system user options. The decentralized voicemail system could also provide the user of the device with an option to only drop the call a single time but to allow future calls through for consideration by the user. For example, if the user does not want to talk to a particular person at that point in time and does not want to deal with a voicemail, the user could drop the call, but still be willing to take calls in the future from that person.

In some embodiments, the call blocking input received from the user at the decentralized voicemail system may be shared with other decentralized voicemail systems on other mobile phones such that the collective decentralized voicemail systems serve to combat spam calls, robotic calls, and the like through accumulation and sharing of a database of bad numbers that are to be collectively blocked by the decentralized voicemail systems. Where the decentralized voicemail system is supported by the mobile carrier and incorporated into the mobile device prior to sale, the decentralized voicemail system may become a strong tool in the fight against unwanted telephone calls.

The decentralized voicemail system may provide essentially any desirable option to the user of the mobile device. The options discussed above represent options that may be provided, but are not intended to represent the entire subset of possible options that could be provided by the decentralized voicemail system.

The treatment of the call by the decentralized voicemail system provides many features of embodiments of the invention, and the decentralized voicemail system may do so entirely on the mobile device and using resources of the mobile device, except in instances where the user of the mobile device optionally engages the centralized mobile carrier voicemail system. In other words, functions discussed herein may be provided without relying on resources available on or through the mobile device network, other than the connection of the call itself.

Figure 4:
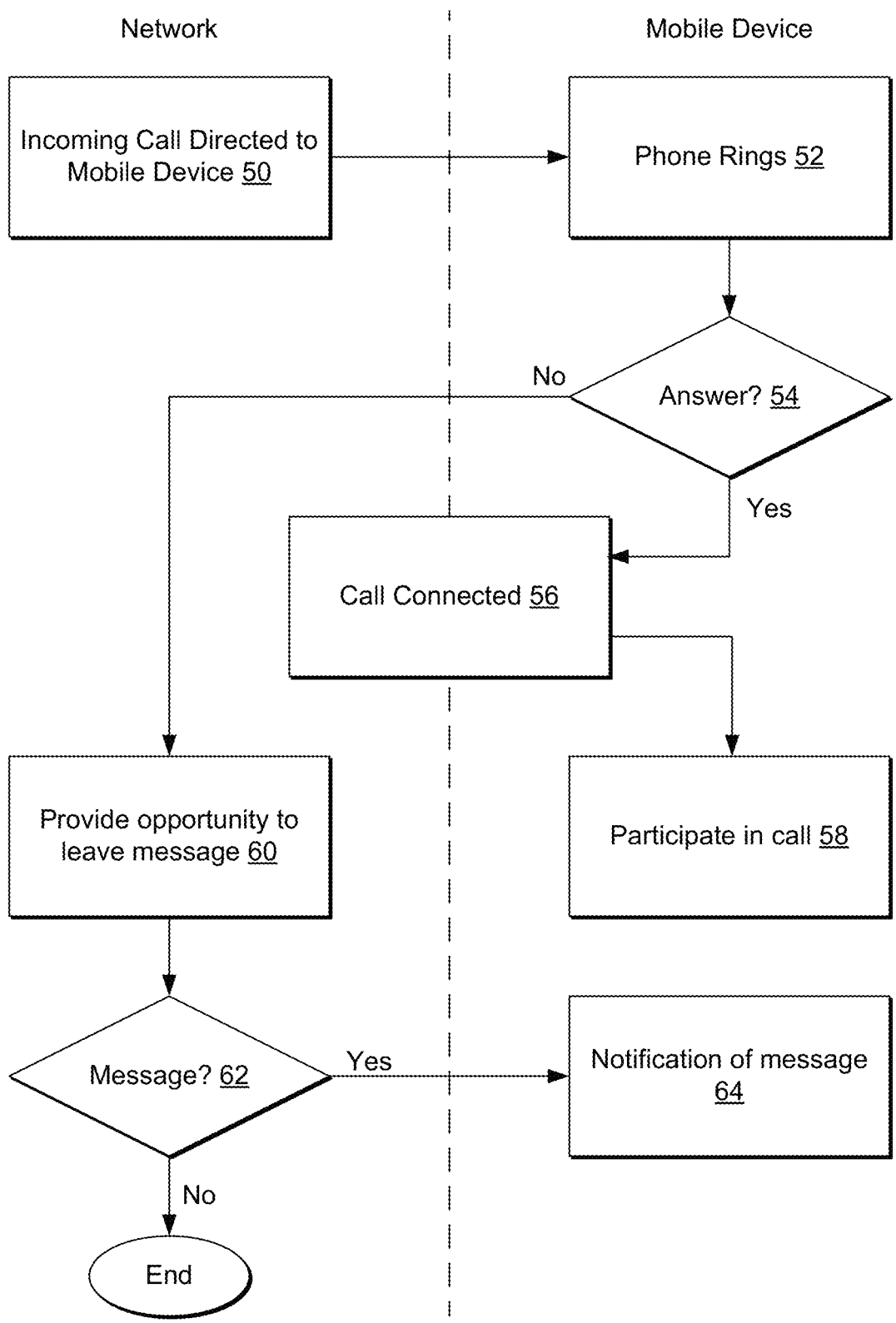
FIG. 4 shows a representative prior art method for handling an incoming phone call.

To contrast the handling of incoming calls by the decentralized voicemail system, FIG. 4 depicts a typical telephone call received by a mobile device according to existing methods. In this method, the network detects an incoming call directed to a particular mobile device at step 50, and directs the incoming call to that mobile device. The mobile device accordingly rings or otherwise notifies the user of the incoming call at step 52. At decision block 54, the user decides whether or not to answer the call, including based on any caller ID information provided by his or her mobile device. If the user opts to answer the call, execution proceeds to step 56, wherein the mobile device and the network cooperate to connect the incoming call, and the user then participates in the call at step 58. If, instead, the user does not answer the call, the network takes over again (forced engagement) and may optionally provide the incoming caller with an opportunity to leave a message for the user at step 60. Alternatively, in the case where the user's mobile device is not connected to the network, the network may immediately provide the incoming caller with an opportunity to leave a message for the user at step 60. At decision block 62, a determination is made as to whether a message was received. If a message was received, the network delivers a notification of the message to the mobile device at step 64, otherwise, execution ends. The user then is required to access the voicemail using the centralized mobile carrier voicemail resources.

Figure 5:
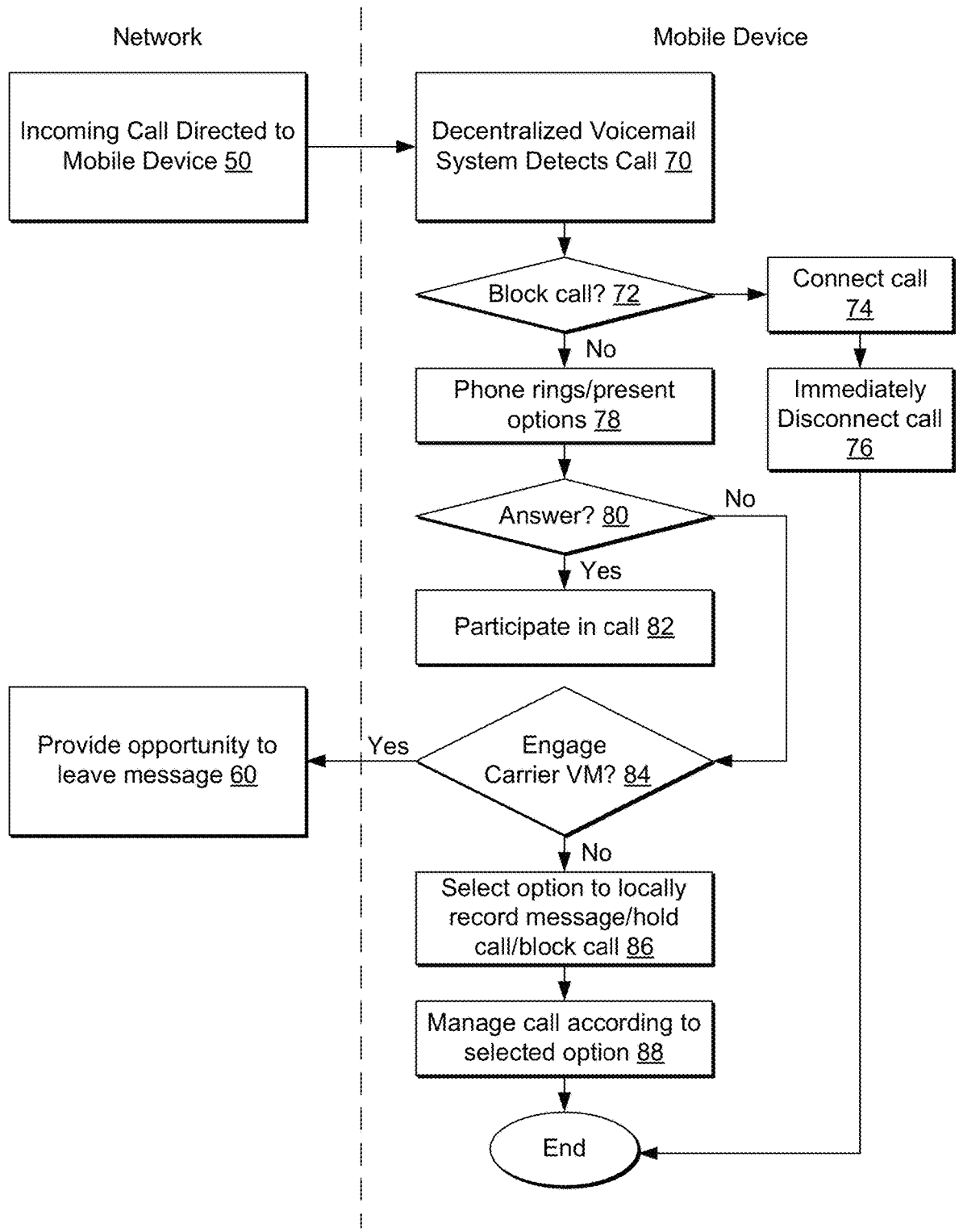
FIG. 5 shows a representative method for handling an incoming phone call in accordance with embodiments of the invention.

In contrast, FIG. 5 illustrates a method in which the decentralized voicemail system is present on the mobile device and manages the incoming call. In cases where the mobile device is not connected to the network, the incoming call may be managed according to existing processes. The process when the mobile device is connected to the network begins similarly, with the network detecting an incoming call directed to a particular mobile device at step 50. The network handles the call in exactly the same way, directing the incoming call to the mobile device. In this case, however, the decentralized voicemail system, acting as a layer between the network and the user, first determines at decision block 72 whether the incoming call is one that should be blocked (e.g., because the user of the mobile device has previously selected an option to connect to and drop the call without providing an opportunity to leave a voicemail and to treat all further calls from that phone number in similar fashion). If the call is to be blocked, the decentralized voicemail system proceeds to step 74, where the call is connected at the mobile device, and then directly to step 76, where the call is immediately dropped or disconnected without providing an opportunity for the maker of the incoming call to leave a message. Thereafter, execution ends and the decentralized voicemail system is prepared to manage the next received call.

If the incoming call is not from a caller known to the decentralized voicemail system as one to be blocked, execution proceeds to step 78, where the decentralized voicemail system causes the mobile device to ring or otherwise notify the user of the incoming call. At this step, the user is also provided options for how the decentralized voicemail system should manage the incoming call. Any of the options discussed previously may be provided by the decentralized voicemail system. At decision block 80, the decentralized voicemail system determines whether the user of the mobile device has elected to answer the incoming call. If so, execution proceeds to step 82, where the decentralized voicemail system activates a microphone and speaker of the mobile device and connects the incoming call, whereupon the user of the mobile device participates in a telephone call as normal. In some embodiments, the user of the mobile device may be provided with options for further handling the call at any point after participation in the call begins, such as dropping the call and blocking all future calls, sending the caller to the voicemail collection process, placing the caller on hold, or any other desirable option.

If the user does not elect to participate in the call at decision block 80, execution of the method proceeds to step 84, wherein the decentralized voicemail system determines whether the user has selected an option to engage the centralized mobile carrier voicemail system (optional engagement). Because the decentralized voicemail system has not, at this point, actually negotiated with the mobile carrier network to answer and connect the call, pushing the call to the centralized mobile carrier voicemail system remains an option available to the decentralized voicemail system and to the user. Typically, this option is only exercised upon receipt of an affirmative action from the user of the mobile device, such that the centralized mobile carrier voicemail system is only rarely engaged when the mobile device is connected to the network. If the user elects to engage the centralized mobile carrier voicemail system, the caller is provided an opportunity to leave a voicemail according to traditional processes at step 60.

Otherwise, execution proceeds to step 86, where an option is selected to locally record a message (with or without screening), to place the caller on hold, to block the call, or to otherwise manage the incoming call locally at the mobile device, without engaging the centralized mobile carrier voicemail system. The option that is selected may be selected by an action received from the user of the mobile device, or, if no selection is received from the user, the option may be selected according to a default set in the decentralized voicemail system (typically recording a voicemail locally at the mobile device without call screening). In embodiments of the invention, such as where the decentralized voicemail system defaults to recording a voicemail without call screening, the user may still be provided with an option to interrupt collection of the voicemail and to answer/connect the call. Accordingly, embodiments of the invention may result in fewer "missed" calls, as the user of the mobile device who might be away from the mobile device and unable to reach it in time to answer within the normal answering period can still interrupt a voicemail process and answer the call.

Regardless of the option chosen, execution of the process proceeds to step 88, where the decentralized voicemail system negotiates with the network to answer or connect the call at the mobile device, and then handles the call according to the selected option. Where the selected option is to drop the call, the decentralized voicemail system immediately disconnects the call without providing an opportunity to leave a voicemail. Future calls from that number can be handled according to options selected by the user of the mobile device. If, instead, the selected option is to place the call on hold, the decentralized voicemail system may play an appropriate message notifying the maker of the incoming call to please hold and the call will be answered (a microphone and a speaker of the mobile device remain inactive). If the selected option is to result in collection of a voicemail, the decentralized voicemail system may instead play an appropriate greeting asking the maker of the incoming call to leave a message, and may then begin recording a voicemail. If the option selected includes screening of the message, a speaker of the mobile device may be activated. Otherwise, a speaker and a microphone of the device remain inactivated (or at least not connected to the incoming call) as the voicemail is collected). Thereafter, execution of the method ends.

Figure 6:
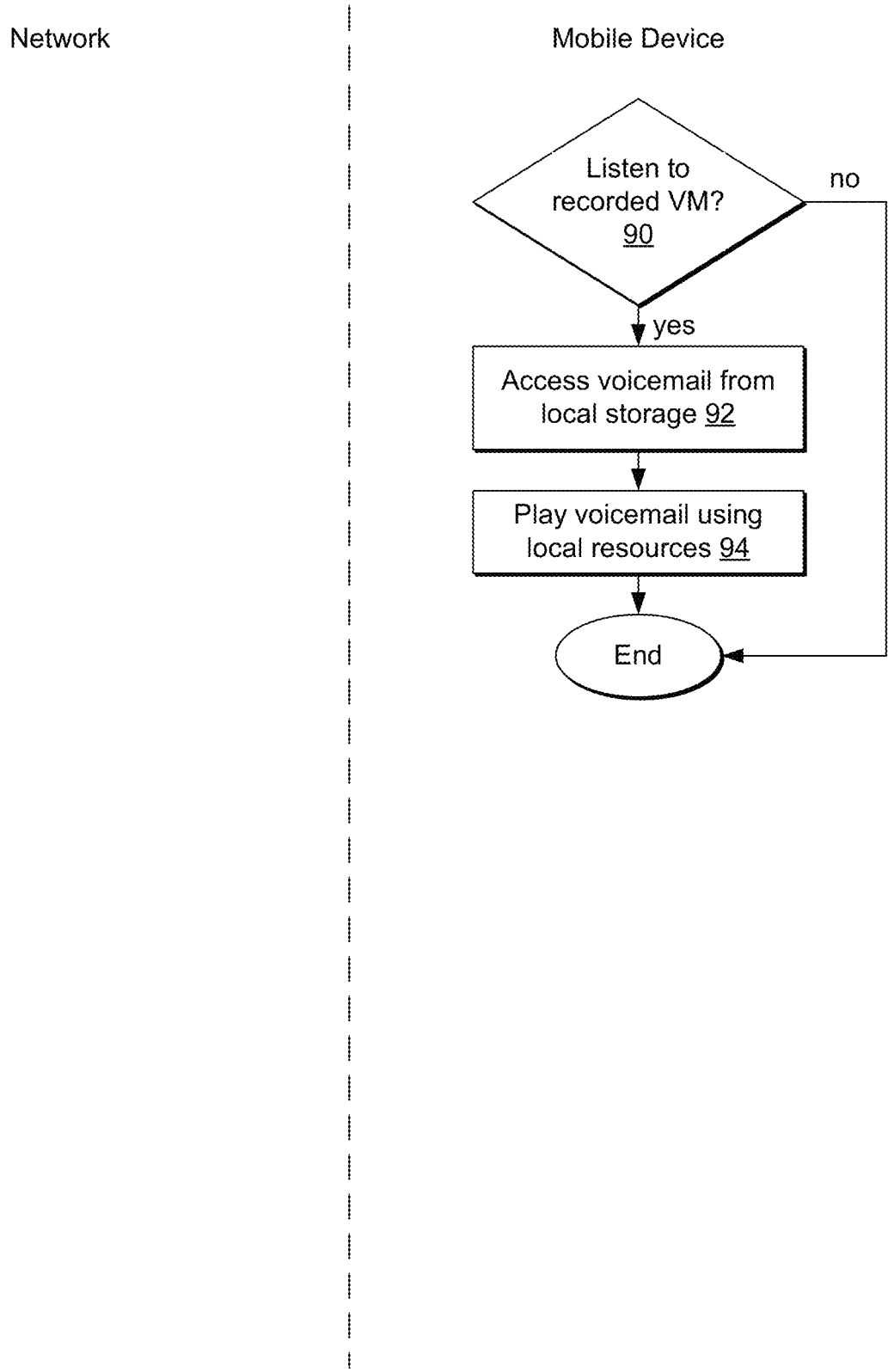
FIG. 6 shows a representative generalized method for listening to a voicemail in accordance with embodiments of the invention.

When the user of the mobile device wishes to listen to a voicemail recorded at the device, a method such as that displayed in FIG. 6 may be utilized. As may be noted from FIG. 6, the method does not involve any use of the network, and accordingly, listening to stored voicemails need not utilize any network or mobile carrier resources. Execution begins at decision block 90 where the decentralized voicemail system determines whether an input to listen to a recorded voicemail has been received. If not, execution ends, but if so, execution proceeds to step 82, where the voicemail is accessed from local storage. The decentralized voicemail system then plays the voicemail using local resources at step 94. If desired, options may be provided related to the voicemail, including options such as options to call back the person who left the voicemail, options to delete the voicemail, options to save the voicemail, options to forward the voicemail, options to attach the voicemail to an email, other options to share the voicemail, and the like. When the user is done listening to or otherwise using the voicemail, execution ends.

The local recording of the voicemail allows the decentralized voicemail system to provide additional functions not currently available with existing systems. First, as the message is recorded locally, it becomes immediately available on the user's mobile device without requiring any accessing of the network. Thus, if the mobile device is not in communication with the network when the user wishes to listen to the message, the user is not hindered in listening to the recorded message. Instead, the user simply accesses the locally-stored message. Unlike with other systems that remotely record a message and then deliver it at a later time for consumption, the decentralized voicemail system locally records and stores the message in real time as part of the original call and makes it immediately available for consumption at the mobile device and without any involvement from the carrier or the network other than through the original call connection. Thus, for example, unlike other systems that remotely record a message and later require some sort of connectivity of the mobile device to obtain the recorded message, the decentralized voicemail system makes the recorded message immediately available, in real time, without requiring later network access. In fact, in some embodiments, consumption of the voicemail may even begin before collection of the voicemail is complete.

Similarly, because the message is locally stored, the user is able to perform additional actions with respect to the message. For example, the user may attach a file containing the voice mail to an e-mail using an e-mail application on the mobile device. Alternatively, the user may attach a file containing the voice mail to a short message service (SMS) or multimedia message service (MMS) message. Such capability may include a capability to modify a format of the stored message. Alternatively, the capability may include a capability to excerpt and send only a portion of the saved message. Additionally, as will be described in more detail below, the decentralized voicemail system may be used to forward a copy of the voice message to the decentralized voicemail system of another mobile device as a talk message using voice network capabilities (e.g. a voice phone call) of the respective mobile devices. As another example, the voice message file may be used in conjunction with other programs: a voice message or portion thereof could be calendared on a calendar of the mobile device (any other synched calendars) to provide an audio reminder at a certain date/time. Then, the recipient could refresh his or her memory at the calendared date/time or at any other desirable time. The decentralized voicemail system could even calendar all voice messages, effectively creating a calendar-accessed audio diary of voice messages.

Finally, as the voice message is stored locally, the user may copy and/or transfer a file representing or containing the voice message from the mobile device to any connected storage device and/or other computing device. For example, mobile devices are commonly capable of having mass storage devices (e.g. memory cards) be at least intermittently connected to the mobile devices. Such mass storage devices can be used to copy or transfer files from the mobile devices to other computing devices or may be used for long-term storage of files deposited thereon. Alternatively, the mobile device may act as a mass storage device and may be connected by a wired (e.g. USB) or wireless (e.g. Bluetooth or IEEE 802.11x) connection or combination thereof to one or more other computing devices, and a file representing or containing the voice message can be copied or transferred to the other computing device through the communicative connection.

In some instances, the decentralized voicemail system may be configured to automatically take action to copy or archive the voice mail messages so that a copy of the voice mail message exists separate from the user's mobile device. Thus, if the mobile device is later lost or stolen, the user is still able to access the voice mail message from the archived copy. Examples of automatic actions to archive or copy messages include automatic e-mailing of messages as they are received or at a later time, automatic archiving to another computer device of all non-archived messages whenever a communicative connection (whether wired or wireless) to the other computer device is detected, and the like. Alternatively, in some instances, automatic archiving may be delayed until a certain type of communicative connection (e.g. a free or low-cost communicative connection, or a high-speed communicative connection) is available. In some instances, the copying or archiving may be selective at direction of the user, rather than automatic. As desired, multiple redundant copies of messages may be either automatically or selectively made.

As may be appreciated, the ability to natively copy or transfer the voice message without necessarily involving the network of the communications provider not only potentially lightens the use of the network resources, but also provides increased security to the user that his or her important messages will not be lost. When users rely on the communications provider to store their voice mail messages, it is not uncommon for such messages to be lost due a variety of factors. For example, it is possible for such messages to be accidentally deleted due to user error while trying to access the messages (e.g. pressing the key corresponding to 'delete' rather than 'save'). Messages may also be lost due to provider retention policies dictating deletion of stored messages after passage of a certain amount of time. Alternatively, it is possible for such messages to be lost due to provider error, such as during equipment upgrades, power outages, etc. It is also possible for such messages to be lost due to malicious actions of third parties such as hackers or parties that surreptitiously gain access to users' voice mail account information. In some such circumstances, it may be impossible to recover lost voice mail messages.

Service providers will find it advantageous to provide the decentralized voicemail system to address these risks and to transfer responsibility for risk of loss from the service provider to the user. When the user knows saving his or her voice mail messages is dependent on his or her own action, the user is likely to be more proactive in taking action to preserve important voice mail messages. Service providers who provide access to the decentralized voicemail system are likely to obtain a favorable increase in customer satisfaction due to the advanced handling of the voice messages provided by the decentralized voicemail system. Thus it will be highly advantageous for service providers to provide the decentralized voicemail system preinstalled or as an option on their mobile devices with phoning capabilities.

In some embodiments, the decentralized voicemail system may compare incoming caller information (e.g. caller ID information) with a contact list of the user of the mobile device, and may identify that the incoming caller is a person on the user's contact list. The decentralized voicemail system may then make a determination as to whether the mobile device's user has designated a custom audio file or custom greeting for incoming calls from the incoming caller, and may present the custom audio file to that incoming caller instead of a standard audio file or message requesting a voicemail. The custom audio file may be essentially any audio file or track selected by the user, such as a music track, a customized greeting (e.g. "Hi Joe, please wait and see if I can take your call."), sound effects, a joke, or the like.

Because the custom audio file or greeting is presented to the incoming caller by the decentralized voicemail system on the mobile device after the call has been connected, there are essentially no limits on the custom audio file or greeting that may be presented to the incoming caller. The custom audio file or greeting may be of any desired length, and may be customized not only by identity of the incoming caller, but may be further customized by time of day, day of week, length of time since last telephone call between the incoming caller and the user of the mobile device, current news, or essentially any other customization factor. Thus, the incoming caller might never have the same custom audio file twice. Indeed, the incoming caller might even be presented with streaming media streamed by the mobile device at the time of the call, such that the incoming caller, while waiting on hold, might be presented with a live news program, a music station, audio of a sporting event, or the like. The incoming caller could even be permitted to change streaming media channels while waiting, such as by pressing keypad numbers on his or her own phoning device.

The customized audio file or greeting need not be limited to customized audio files or greetings that are preselected by the user or that are selected by the decentralized voicemail system and/or mobile device. Instead, the user of the mobile device may be presented with incoming caller information (e.g. the identity of the caller). While the decentralized voicemail system may or may not initially select and provide the customized audio file or greeting, the user of the mobile device may simultaneously be presented with choices as to how to respond to the incoming call.

Figure 7:
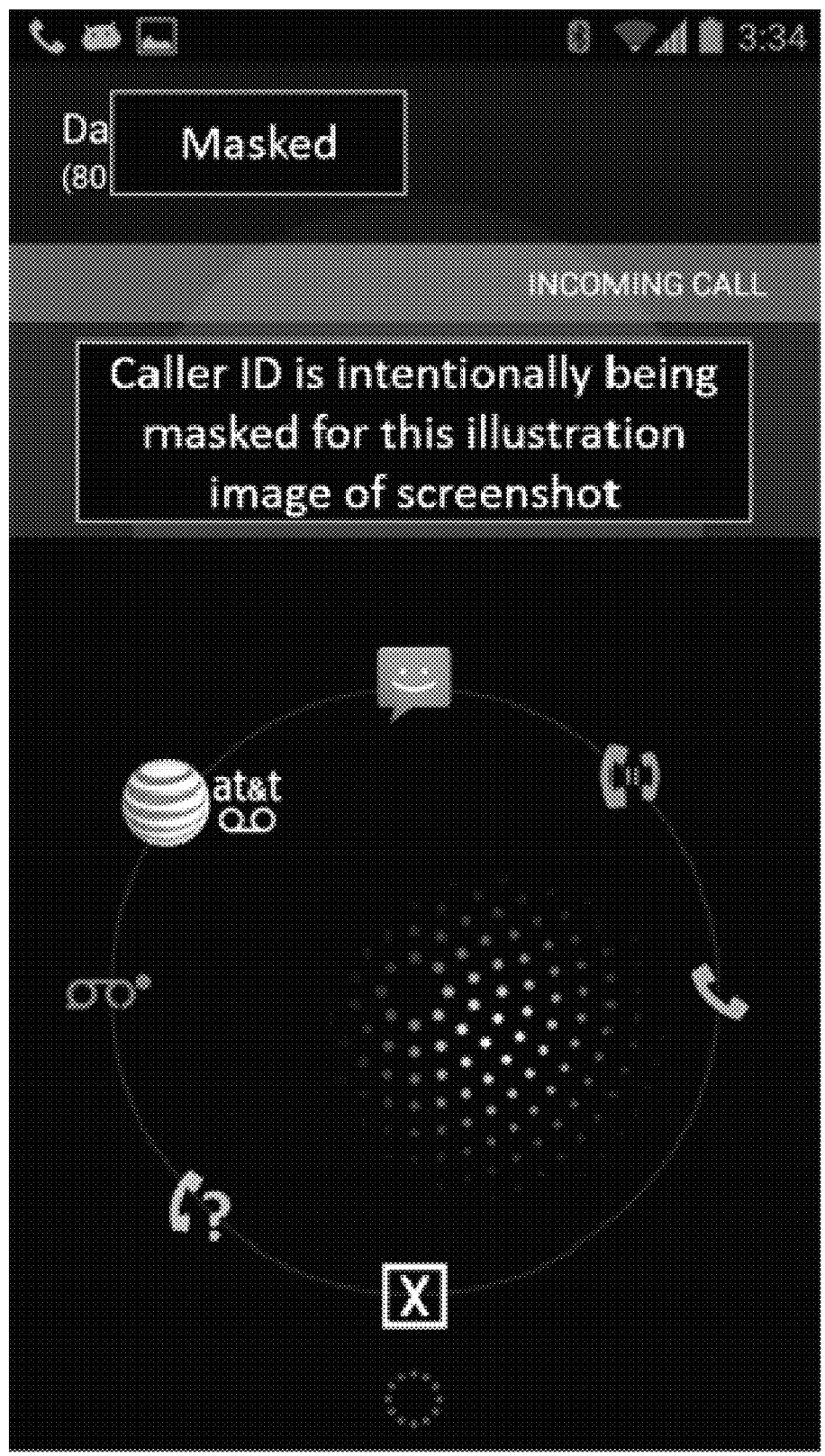
FIG. 7 shows a representative display of a mobile device operating in accordance with embodiments of the invention.

FIG. 7 shows a representative mobile device display that might be displayed to a user of the decentralized voicemail system upon receipt of an incoming call. The user might be permitted to select from various call handling options, such as (proceeding counter-clockwise from the 3:00 position in FIG. 7) (1) Answer call, (2) Please hold, (3) Send to carrier voicemail system with text message, (4) Send to carrier voicemail system without text message, (5) Send to local voicemail without screening (placed at the 9:00 position in this example so as to take advantage of consumer habits such that the traditional motion of denying the call (see FIG. 1) will result in local voicemail collection), (6) Send to local voicemail with screening, and (6) X (drop) the call.

If, for example, the user is in a meeting or other situation where it is not socially acceptable to accept the incoming call, but the user can excuse him or herself to take the call, the user might be permitted to select a button so indicating (e.g. Please hold in FIG. 7), and the customized audio file or greeting may be modified accordingly, such as by an interruption message asking the incoming caller to stay on the line. For example, the incoming caller receives a message such as "I'm in a meeting but want to take your call and am stepping out of the meeting to take your call. Please stay on the line." The standard or customized audio file might then resume.

Such an interruption message might even be recorded in the user's voice, and the user may record a number of such interruption messages. The user may be permitted to select any available such messages or standard interruption messages to be presented to the incoming caller. Such messages may be of significant benefit to incoming callers and mobile device user alike. An interruption message may be discretely selected by the mobile device user without disturbing others in his or her surroundings. Alternatively, the interruption message may be selected in advance according to the user's circumstances. Additionally, the incoming call would not be limited to being answered within a set period of time or number of rings, and otherwise the call would be missed. Instead, the incoming caller may be provided with a notification that the call will be taken shortly, and may meanwhile be provided with the customized audio file while waiting for the call to be taken.

As is discussed above, the customized audio file may be customized based on the identity of the incoming caller, such that no two incoming callers need receive the same customized audio file. Additionally, the customized audio file may be further customized based on whether or not the incoming caller is on the user's contact list or not. If not, the incoming caller may be presented with a customized audio file that asks the incoming caller to identify his or herself. As an example, the incoming caller might receive an audio file such as "I don't recognize who you are. Please state your name so I can decide if I can answer your call." The incoming caller could then state his or her name or other pertinent information.

Other features may be provided in light of the connected call being handled by the decentralized voicemail system. For example, with existing voice messaging systems that are reliant on the service provider's network and systems, once an incoming call has been transferred to the messaging system, the transfer is irreversible. With embodiments of the invention, additional features and options may be provided even once the call has been transferred to voice mail. Such features may mimic features used with physical answering systems in wired phone systems. In such systems, the user could effectively listen in to a message as it was being left and could choose to pick up the line and participate in the call. While similar features have never been available in the mobile device and cellular world, similar features can be readily provided using the decentralized voicemail system.

To provide such a feature, the decentralized voicemail system may cause the mobile device to display incoming call information (e.g. caller ID, etc.), and may provide the user with several options after the call has been connected by the decentralized voicemail system and a voicemail is being recorded. The options provided to the user may include options such as answering the call, screening the voice mail from the beginning or in real time, or dropping the call.

While the message is being left, the decentralized voicemail system may cause the mobile device to display additional options to the user. Such options may include playing the incoming message on speakerphone as it is being left, discontinuing listening in on the message as it is being left, and/or interrupting the voice message. If the user selects to interrupt the voice message, the decentralized voicemail system unmutes one or more relevant microphones of the mobile device, and the user is able to communicate with the incoming caller as per a regular telephone call, because the call was always connected by the decentralized voicemail system. If desired, the decentralized voicemail system may be configured or may provide options to continue recording and to save the message and/or the ongoing conversation, or a portion thereof, or may be configured or may provide options to automatically discontinue recording and to discard any recording taken to that point.

Because the mobile device is tied up with an active phone call while any message is being left, the decentralized voicemail system may be provided with options to limit the length of incoming callers' voice messages. Such limits may be provided on an individual basis by contact or by unknown contact. Such limits may be selected by the user on the fly as incoming calls are received, or may be previously designated. Limits may also be based on a variety of other factors. For example, the decentralized voicemail system may be configured with settings relating to the user's voice plan (e.g. number of minutes, unlimited calling periods, billing cycle, etc.), and the limits for incoming messages may be automatically configured based at least in part on such factors. Thus, if the user appears to be using his or her plan's minutes too quickly for the given billing cycle, the decentralized voicemail system may automatically limit incoming message length during certain periods of time, but might allow unlimited length messages during unlimited minutes periods of time (e.g. nights and weekends). Similarly, the decentralized voicemail system may limit message lengths during periods of time when the mobile device is roaming instead of in-network.

Because the decentralized voicemail system is in control of such features and is also able to provide customized greetings to incoming callers, it may also provide notification of incoming message limits to incoming callers. Thus, the decentralized voicemail system may not only indicate to an incoming caller to leave a message, but may also indicate that the incoming message should be limited to a certain length of time (e.g. one minute).

When voice messages are received, the decentralized voicemail system can provide a variety of playback features to the user that are not available with standard network-based voice mail access systems. Many mobile devices have advanced input/output features. Such features may permit advanced playback of the recorded voice messages. For example, a touch screen could be used to selectively move to any point within a voice message, such as using a message timeline, scroll bar, or the like. Other controls may be provided to play, pause, quicken playback, slow down playback, or the like. Controls may be provided for adjusting volume, adjusting audio quality such as noise control, treble, or base, or the like. Any of a broad range of audio controls known in the art of audio playback may be provided that are not available using cell phone providers' network call-in systems.

Features and options may also be provided to allow the user to take action with respect to recorded messages and/or to respond to the caller. For example, the user may be provided with options when viewing/listening to a message to send the message by e-mail, MMS message, or the like, to save the message to a file, to add a description to the message, to add notes to the message, to associate the message with calendar items, and the like. One additional benefit that may be provided in accordance with embodiments of the invention is the ability to lock messages to prevent accidental deletion from the mobile device. Taking such an action may prevent accidental message loss that can be all too common with existing systems. In some embodiments, if a lock action is selected, the decentralized voicemail system may be configured to automatically archive a copy of the message off device, as has been described previously.

Saved messages may not merely be saved by the decentralized voicemail system and/or mobile device, but may be intelligently saved in ways that facilitate later access of saved messages. By way of comparison, existing phone message systems accessed by calling in to the service provider's network messaging system are typically limited to listening to messages in chronological order, such that multiple saved messages might need to be listened to for the user to locate a message of interest. In contrast, the decentralized voicemail system in accordance with embodiments of the invention not only may display messages in chronological order, but may also display messages by contact, length, description or notes added by the user, "favorite" status or designation, and any of a variety of other factors. As may be also appreciated, the mobile device may be able to display onscreen multiple voice messages from which to select to listen to, further increasing the speed at which a desired message can be selected for later listening. Similarly, the decentralized voicemail system can facilitate navigation of voice messages by selectively displaying contact information, including pictures or even videos, associated with each saved message. Thus, a user seeking a message from a particular contact could do so easily by scanning the messages for a picture of that contact.

Other features may be provided by the decentralized voicemail system to benefit the user of the mobile device. For example, existing caller ID systems are fairly limited in their ability to provide information to the user of the mobile device. Existing systems may provide the name and number of the caller if available, and may cause a device to emit a contact-specific ringtone. In contrast, the decentralized voicemail system in accordance with embodiments of the invention can provide the user of the mobile device with video ringtones to convey additional information to the user. For example, the portions of the screen used to provide call handling options represent a minor portion of the screen space of the mobile device. The remainder of the screen space is available for providing visual content to the user, which content may optionally be synchronized with audio content.

The video content may include full-motion recorded video content recorded by the user of the mobile device or obtained elsewhere. The video content may also include animations obtained from any source. Additionally, the video content may include one or more still images displayed statically or in motion with transitions and the like. The video and any audio content may more readily and rapidly convey to the user the identity of the incoming call. For example, one family member might incorporate still pictures of other family members into video ringtones assigned to each family member. Then, when an incoming call is received from one of the family members, the recipient can determine at a quick glance or from audio information who is calling.

According to embodiments of the invention, a website is provided that users of the decentralized voicemail system could visit to create video ringtones. The users could use media available at the website, could use media readily available on the Internet, or could upload their own media as desired. The media could be incorporated into a video ringtone at the website, and then the video ringtone could be downloaded to the mobile device and associated with a contact or contacts, such that incoming calls from that contact or those contacts would trigger the associated video ringtone. As another alternative, video ringtones could be created on the mobile device itself using media available at the device, including media recorded using inputs of the mobile device, and associated with one or more contacts similarly. Regardless of the method used, creation of the video ringtones may be optimized for the specific mobile device used, and may be created using software optimized for non-technical user creation of the video ringtones.

Video ringtones in accordance with embodiments of the invention can be used in ways that may greatly facilitate social networking and the exchanging of information between users of mobile devices and the like. For example, a user may create a video ringtone for him or herself. Such a video ringtone might not typically be used to identify the user to him or herself. Instead, the user could share the video ringtone with other users and mobile devices. As one example, the user of a mobile device having the decentralized voicemail system might encounter someone at a conference with whom the user wishes to exchange contact information. Instead of manually conveying contact information, the user could simply transmit his or her video ringtone to the other device, such as using near field communication or any other appropriate communication method. Then, that other device's decentralized voicemail system could display the video ringtone when a call is received from the first user.

Video ringtones that are shared in manners similar to these could also serve as mini or micro advertisements of the users. Thus, for example, a user might create a video ringtone that provides information about the user's abilities, sills, and the like. Then, when the user transmits his video ringtone to other users and then calls those other users, the video ringtone would not only identify the first user's identity, but would advertise his abilities, skills, and the like to others. Businessmen would benefit from the distribution of video ringtones by effectively micro-targeting video ringtone advertisements.

Another feature that may be provided by embodiments of the decentralized voicemail system is a method to retrieve and locally store voice mail messages stored remotely by the service provider. As mentioned above, when the mobile device is not connected to the network, such as when the mobile device is out of range or powered down, the service provider may still provide traditional voice message services, allowing incoming callers to leave a message that is stored by the service provider and made available over the network. While this provides flexibility to the user, the remotely-stored messages are subject to all the difficulties discussed previously. Retrieving the messages and storing them locally addresses many of those difficulties.

The decentralized voicemail system may retrieve the messages from the service provider over the network using any of a variety of schemes. As a first example, the decentralized voicemail system may utilize existing access procedures to cause the carrier's systems to play back the recorded and remotely-stored message. Most carriers allow for a repeated playback of the message upon selection of a replay action (e.g. pressing one of the keypad numbers). According to embodiments of the invention, the decentralized voicemail system provides the user with a menu selection item (similar to those shown in FIG. 7) when the user is logged in to the carrier's system. When the user activates the menu selection item, the decentralized voicemail system causes the mobile device to send the replay signal back to the carrier. Meanwhile, the decentralized voicemail system mutes or otherwise turns of the microphone of the mobile device to prevent recording of ambient sound and records the message as it is played back by the carrier/service provider.

As may be appreciated, this method of obtaining and locally storing the messages from the carrier does not particularly rely on any particular effort or participation by the carrier. In alternate embodiments, the carrier may be willing to more fully participate in the delivery of recorded messages. For example, the burden on computing resources of the carrier may be reduced by having users store their own voice mails. For example, the carrier may automatically "push" voice mail messages to the decentralized voicemail system, using either a data or voice connection. Where the voice connection is used, the incoming call may be handled as described above, with the decentralized voicemail system accepting the connection without any notification of the incoming call needing to be provided to the user until the full message has been received and stored on the mobile device.

As another alternative, the carrier could automate the retrieval process from its end. The user could select to locally receive a message for on the mobile device storage, and the carrier systems and the decentralized voicemail system could communicate directly with each other. The carrier systems could send signals to the decentralized voicemail system that would cause the mobile device to mute its microphone, start recording, and stop recording at the appropriate times, such as using tones to signal between the carrier systems and the decentralized voicemail system. The user would then only need to assign any desired names and/or contacts to the recorded files to facilitate later access.

Carriers and other service providers would greatly benefit from implementing such systems. Not only would the carriers and service providers reduce the load on their message storage computing systems by reducing the total volume of stored messages, but the carriers and other service providers could obtain a revenue stream by charging additional fees for the use of the automated message push feature as provided by the decentralized voicemail system. Carriers could add the feature to push message storage to the mobile device as a separate menu item in their voicemail access systems, or could even automatically push messages to the mobile devices upon reconnection of the mobile devices to the network, e.g. upon power up or on coming in range of the network.

In these various fashions, embodiments of the invention provide multiple improvements for handling of incoming calls that provide a host of features for both the incoming caller and the user of the mobile device and decentralized voicemail system. The decentralized voicemail system need not be limited to handling of incoming standard calls however. Because the decentralized voicemail system "answers" all incoming calls, the decentralized voicemail system may be used to provide advanced talk messaging features that mimic the convenience of text messaging without using text messaging or data plans, and without the typically-cumbersome text entry systems of text messaging systems.

These features are provided by the decentralized voicemail system through its ability to answer all incoming calls and to otherwise access the mobile device's phoning capabilities. The talk messaging feature allows the user to create a talk message by simply talking into the mobile device while the decentralized voicemail system records the talk message as a saved audio file for transmission. The decentralized voicemail system then receives any delivery options from the user and delivers the talk message according to the user-selected delivery options. Such options include the person or contact to whom the talk message is to be delivered, any delivery schedule or urgency options, and optionally any alert notifications to be provided to the recipient.

The talk message can be delivered to any standard phone by the decentralized voicemail system. The decentralized voicemail system places a call to the designated contact and intelligently plays the talk message to the recipient. The decentralized voicemail system may provide the recipient options for playing the message multiple times (e.g. by pressing a number on the receiving device), and may also intelligently detect voice messaging systems to leave the talk message at an appropriate moment. Additionally, the decentralized voicemail system may play an introduction indicating that a talk message is being delivered so that the recipient does not attempt to interact with the talk message except as appropriate for replaying the talk message or otherwise navigating through the talk message.

While the decentralized voicemail system is able to interact with standard phoning devices to deliver talk messages in the fashion described above, the decentralized voicemail system is able to intelligently use voice network resources to more efficiently communicate the talk message to any other decentralized voicemail system resident on another device. Thus, when the decentralized voicemail system of a particular device accepts and connects an incoming call as discussed above, the first thing it may do is determine whether the incoming call is being received from a decentralized voicemail system on another device with a talk message to deliver. This can be done using any of a variety of methods, such as is known in the modem communication art, including the use of special tones communicated between the respective decentralized voicemail systems. Such tones need not be unpleasant or even noticeable in the event one or the other of the phoning devices is being used by a human listener.

If the recipient decentralized voicemail system answers a call and recognizes that a sending decentralized voicemail system wishes to deliver an incoming talk message, the recipient decentralized voicemail system may never notify the recipient user that an incoming call is being received (e.g. the mobile device will not ring). Instead, the recipient decentralized voicemail system merely handles the connection, receives the incoming talk message, and then stores and delivers the incoming talk message or notifies the user of the incoming talk message according to any delivery options specified by either the sender or recipient.

In cases where the talk message is delivered from decentralized voicemail system to decentralized voicemail system, it will be appreciated that the talk message need not be directly played as an audible phone message. Instead, the sending decentralized voicemail system may compress the talk message to send the compressed talk message to the recipient decentralized voicemail system. Sending of the talk message in compressed form can greatly accelerate transmission, such that the mobile device's phoning capability is occupied for a minimum length of time (e.g. seconds instead of minutes).

While talk messages are being sent and/or received, the decentralized voicemail system may notify the user that a talk message is being sent/received and that the voice capability is unavailable. A time may be presented to the user to notify the user of when the transmission should be finished and the voice capability will be available. If the voice call capability is urgently needed, the user may be allowed to interrupt the transmission. Thereupon, the decentralized voicemail system(s) may be configured to automatically reestablish a connection between the mobile devices and complete the transmission.

Because the talk message delivered in accordance with the features above does not use the mobile device's data plan or text message plan, it provides an alternative method by which users of mobile devices can communicate. Additionally, because the talk message may be delivered in compressed format, usage of the voice plan can also be greatly limited. Such limitations extend benefits to the service provider as well, as the use of network resources is reduced. Further advantages may be achieved by way of advanced settings when sending talk messages. For example, the system may be instructed to send one or more talk messages only during off-peak unlimited minutes periods of time (e.g. nights and weekends) when delivery time is not critical.

Because delivery of compressed talk messages can be very quick, delivery can even be accomplished in seconds while another call is placed on hold. If, however, delivery cannot be completed on a first attempt, delivery may be achieved by leaving a full-length message on a standard answering system, or delivery may be reattempted later.

The sending user may be provided with the ability to select from a wide variety of options when sending a talk message. The user may select to deliver the talk message at a specific time or when the mobile device is in a period of partial or total inactivity. The user may select to deliver the talk message only when the mobile device is in non-roaming areas, when off-peak unlimited minutes are available, or with any other time restrictions. The user may also designate options related to opening or sharing of the talk message. For example, the user may designate that the recipient should only be notified of the talk message at or after a certain time, regardless of when the recipient device receives the talk message. The user might also designate an urgency of the talk message, such that the recipient's mobile device may provide a different notification or multiple notifications to the recipient if the talk message is not accessed in a timely fashion.

The user might be able to designate that the talk message can only be listened to a certain number of times. Similarly, the user could establish limits on whether the talk message could be saved or otherwise forwarded or shared by the recipient. The user might even designate that the talk message could not be played through the recipient's high-volume speaker, but only through an earpiece. Features such as these may provide some level of security to the talk message.

It may be appreciated that the talk message need not be sent to a single recipient. One benefit of the decentralized voicemail system is that it may permit sending of the talk message to multiple recipients. Similarly, sent talk messages can be saved on the sending device and may be accessed, sent to other recipients, resent, saved to external devices, archived, or the like. As with incoming voice messages, such messages can be saved and/or accessed by time sent, by contact, by length, by description, by "favorite" status, or by any other relevant attribute.

Depending on the settings of the received talk message and the settings of the recipient device, the recipient user may be immediately notified of any received talk messages, or may be notified on a schedule chosen by the sender. Because the received talk messages are essentially recorded audio files, any of a variety of actions may be taken with respect to the recorded audio. For example, the recorded audio may be saved or archived to mass storage devices or external computer devices. The recorded audio may also be played at any time and with audio controls as discussed above. Additionally, if voice recognition software is available, the audio file may optionally be parsed and converted into text format to be read by the recipient for alternate consumption.

In some embodiments, received talk messages may be treated differently from standard voice mails. As discussed above, senders and recipients of talk messages may optionally select options controlled by the senders' and receivers' call handlers and answering machines to control such things as delivery time, notifications, play restrictions, and the like. Additionally, unlike existing standard voice message systems that are commonly restricted to organization by time and date received, talk messages may be prioritized and organized by a variety of other mechanisms, such as by contact, length, etc., such that a user of the decentralized voicemail system may have talk messages (or indeed any other voice mail) from friends prioritized from other voice mails and talk messages. Where talk messages are delivered from the decentralized voicemail system of one device to the decentralized voicemail system of another device, the users can cooperatively control treatment and handling of voice messages to achieve desired effects.

The decentralized voicemail system allows for other specific treatment of talk messages. For example, a user might find that he or she does not want to receive further talk messages from a certain contact. If, for example, the contact has been leaving obnoxious or offensive talk messages (e.g. stalking), the user can select options on his or her decentralized voicemail system instructing the decentralized voicemail system to refuse further talk messages from the contact. When the contact's decentralized voicemail system attempts to establish a connection for delivery of the next talk message, the user's decentralized voicemail system may indicate that talk messages are blocked, e.g. with a message delivered through the contact's decentralized voicemail system (or through standard text messaging systems) indicating that "Talk messaging with this person is unavailable at this time."

Similarly, a user might elect to block receipt of all calls, voice mails, and/or talk messages for a period of time, such as for a period of time during which the user expects to be unavailable (e.g. to attend a movie, appointment, or meeting). The decentralized voicemail system may still immediately answer all incoming calls, or it may reject any incoming calls, which would then be handled by the network according to existing or future practices. If the decentralized voicemail system answers incoming calls, it may notify incoming callers that the user is unavailable and not taking messages or that the caller is unavailable and that received messages will only be delivered to the user at the time designated by the user. If the decentralized voicemail system answers an incoming call from another decentralized voicemail system (e.g. a talk message), it can either accept the incoming talk message and notify the incoming decentralized voicemail system of the delivery restrictions or it can refuse the incoming talk message and the incoming decentralized voicemail system can determine whether to deliver the talk message later or to simply inform the incoming user of the restriction and reason for failed delivery.

Because the call hander and answering machine is able to intelligently interact with other call handlers and answering machines on other devices, the users of call handlers and answering machines can use them to provide intelligent and advanced handling of incoming calls of all types. For example, a husband might instruct his decentralized voicemail system to reject all incoming calls and talk messages while he is in a meeting, but may allow his wife's or child's decentralized voicemail system to override the restriction or to selectively override the restriction. Thus, the wife or child's call or talk message might be connected or delivered without ever being notified of the restriction, or the wife or child could be notified of the desired restriction and could elect to override the restriction. Similarly, a doctor attending a movie could instruct his or her decentralized voicemail system to reject all incoming calls and talk messages except those from his office or call service, such that he could still leave his mobile device on while at the movie and know that his device would not ring and disturb other moviegoers when a friend calls but would still ring (or otherwise notify him or her) if a medical emergency were to occur. The foregoing examples are merely illustrative of the intelligent call handling that can occur with embodiments of the invention.

Thus, embodiments of the invention provide new features and benefits not currently available to users of mobile devices. Such features and benefits are provided by way of the decentralized voicemail system. While the decentralized voicemail system has been described as operating on the mobile device independently from the service provider or its network, it should be appreciated that variations of the decentralized voicemail system are embraced by the embodiments of the invention. For example, as the decentralized voicemail system becomes common, users of standard land-line phone systems may wish to obtain features provided by the decentralized voicemail system, and the decentralized voicemail system may be installed in such systems. As another alternative, some or all features of the decentralized voicemail system may be adopted by service providers and be provided at the network level, such as when users' mobile devices are not in communication with the service providers' networks (e.g. are turned off, are actively handling a different call, etc.). Thus embodiments of the inventions are not necessarily limited to use with or on mobile devices only, but use with mobile devices is illustrative of features of embodiments of the invention.

The present invention may be embodied in other specific forms without departing from its spirit or essential characteristics. The described embodiments are to be considered in all respects only as illustrative and not restrictive. The scope of the invention is, therefore, indicated by the appended claims, rather than by the foregoing description. All changes which come within the meaning and range of equivalency of the claims are to be embraced within their scope.

What is claimed and desired to be secured by Letters Patent is:

1. A device comprising hardware capable of providing telephonic capability and further comprising:
   one of software, hardware, and a combination of software and hardware configured to:
   receive an incoming telephone call;
   notify a user of the device of the incoming call; and
   provide the user of the device with a plurality of options for managing the incoming call, the plurality of options for managing the incoming call comprising:
   an option to divert the incoming call to a centralized voicemail system operated by a mobile carrier;
   an option to answer the incoming call at the device, play a greeting to the maker of the incoming call asking the maker of the incoming call to leave a message, and locally record a voicemail at the device without utilizing the centralized voicemail system operated by the mobile carrier and without further participation of the user of the device;
   an option to answer the incoming call at the device, play a greeting to the maker of the incoming call asking the maker of the incoming call to leave a message, locally record a voicemail at the device without utilizing the centralized voicemail system operated by the mobile carrier, and screen the voicemail in real time as it is left by the maker of the incoming call using a speaker of the device;
   an option to answer the incoming call at the device and play a greeting to the maker of the incoming call asking the maker to please hold;
   an option to answer the incoming call and immediately allow the user of the device to participate in a telephone call with a maker of the incoming call;
   an option to cause the device to answer the incoming call and to manage the answered incoming call without immediately connecting the user of the device to participate in a telephone call with the maker of the incoming call; and
   an option to answer the incoming call at the device and immediately disconnect the incoming call.

2. The device as recited in claim 1, wherein the plurality of options for managing the incoming call comprise:
   an option to divert the incoming call to the centralized voicemail system operated by the mobile carrier without sending a text message to the maker of the incoming call; and
   an option to divert the incoming call to the centralized voicemail system operated by the mobile carrier and to compose a text message to the maker of the incoming call.

3. The device as recited in claim 2, wherein when the option to answer the incoming call at the device, play a greeting, and locally record a voicemail without further participation from the user is selected, the device provides an option to review the recorded voicemail to the user of the device.

4. The device as recited in claim 2, wherein when the option to answer the incoming call at the device, play a greeting, and locally record a voicemail, and screen the voicemail in real time is selected, the device provides an option to cease screening the voicemail and allow the maker to keep leaving the voicemail, an option to connect the user of the device to the maker to participate in a telephone call, and an option to immediately disconnect the incoming call.

5. The device as recited in claim 4, wherein when the option to answer the incoming call at the device, play a greeting, and locally record a voicemail, and screen the voicemail in real time is selected, the device activates a speaker of the device without activating a microphone of the device, whereby the speaker plays a message being left by the maker of the incoming call in real time.

6. The device as recited in claim 2, wherein when the option to answer the incoming call and play a greeting asking the maker to please hold is selected, the device provides an option to connect the user of the device to the maker to participate in a telephone call.

7. The device as recited in claim 6, wherein when the option to answer the incoming call and play a greeting asking the maker to please hold is selected, the device plays a greeting to the maker of the incoming call over a telephonic connection.

8. The device as recited in claim 2, wherein when the option to answer the incoming call and immediately disconnect the incoming call is selected, the device provides an option to always manage future calls from the maker in the same fashion, and an option to not always manage future calls from the maker in the same fashion.

9. The device as recited in claim 2, wherein when the option to answer the incoming call and immediately disconnect the incoming call is selected, the device answers the incoming call and disconnects the incoming call without an opportunity being provided to the maker of the incoming call to leave a voicemail message locally or on the centralized voicemail system.

10. A device comprising hardware capable of providing telephonic capability and of reducing an operating load of a centralized mobile carrier voicemail system, the device further comprising:
one of software, hardware, and a combination of software and hardware configured to:
receive an incoming telephone call;
notify a user of the device of the incoming call; and
provide the user with an opportunity to either optionally engage the centralized mobile carrier voicemail system to manage the incoming call or alternatively to manage the incoming call locally at the device by providing the user of the device with a plurality of options for managing the incoming call, the plurality of options for managing the incoming call comprising:
an option to divert the incoming call to the centralized mobile carrier voicemail system;
an option to answer the incoming call at the device, play a greeting to the maker of the incoming call asking the maker of the incoming call to leave a message, and locally record a voicemail on a local storage media of the device without utilizing the centralized mobile carrier voicemail system and without further participation of the user of the device;
an option to answer the incoming call at the device, play a greeting to the maker of the incoming call asking the maker of the incoming call to leave a message, locally record a voicemail at the device without utilizing the centralized voicemail system operated by the mobile carrier, and screen the voicemail in real time as it is left by the maker of the incoming call;
an option to answer the incoming call at the device and play a greeting to the maker of the incoming call asking the maker to please hold;
an option to answer the incoming call and immediately allow the user of the device to participate in a telephone call with a maker of the incoming call; and
an option to cause the device to answer the incoming call and to manage the answered incoming call without immediately and fully connecting the user of the device to participate in a telephone call with the maker of the incoming call; and
an option to answer the incoming call at the device and immediately disconnect the incoming call.

11. The device as recited in claim 10, wherein the plurality of options for managing the incoming call comprise:
an option to divert the incoming call to the centralized mobile carrier voicemail system without sending a text message to the maker of the incoming call; and
an option to divert the incoming call to the centralized mobile carrier voicemail system and to compose a text message to the maker of the incoming call.

12. The device as recited in claim 11, wherein when the option to answer the incoming call at the device, play a greeting, and locally record a voicemail without further participation from the user is selected, the device provides an option to review the recorded voicemail to the user of the device.

13. The device as recited in claim 11, wherein when the option to answer the incoming call at the device, play a greeting, and locally record a voicemail, and screen the voicemail in real time is selected, the device provides an option to cease screening the voicemail and allow the maker to keep leaving the voicemail, an option to connect the user of the device to the maker to participate in a telephone call, and an option to immediately disconnect the incoming call.

14. The device as recited in claim 13, wherein when the option to answer the incoming call at the device, play a greeting, and locally record a voicemail, and screen the voicemail in real time is selected, the device activates a speaker of the device without activating a microphone of the device, whereby the speaker plays a message being left by the maker of the incoming call in real time.

15. The device as recited in claim 11, wherein when the option to answer the incoming call and play a greeting asking the maker to please hold, the device provides an option to connect the user of the device to the maker to participate in a telephone call.

16. The device as recited in claim 15, wherein when the option to answer the incoming call and play a greeting asking the maker to please hold is selected, the device plays a greeting to the maker of the incoming call over a telephonic connection.

17. The device as recited in claim 11, wherein when the option to answer the incoming call and immediately disconnect the incoming call is selected, the device provides an option to always manage future calls from the maker in the same fashion, and an option to not always manage future calls from the maker in the same fashion.

18. The device as recited in claim 11, wherein when the option to answer the incoming call and immediately disconnect the incoming call is selected, the device answers the incoming call and disconnects the incoming call without an opportunity being provided to the maker of the incoming call to leave a voicemail message locally or on the centralized voicemail system.

19. A device comprising hardware capable of providing telephonic capability and of reducing an operating load of a centralized mobile carrier voicemail system, the device further comprising:
one of software, hardware, and a combination of software and hardware configured to:
receive an incoming telephone call;
notify a user of the device of the incoming call; and
provide the user with an opportunity to either optionally engage the centralized mobile carrier voicemail system to manage the incoming call or alternatively to manage the incoming call locally at the device by providing the user of the device with a plurality of options for managing the incoming call, the plurality of options for managing the incoming call comprising:
an option to divert the incoming call to the centralized mobile carrier voicemail system without sending a text message to the maker of the incoming call;
an option to divert the incoming call to the centralized mobile carrier voicemail system and to compose a text message to the maker of the incoming call;

an option to answer the incoming call and immediately allow the user of the device to participate in a telephone call with a maker of the incoming call via a speaker and a microphone of the device;

an option to answer the incoming call at the device without activating a speaker of the device, play a greeting to the maker of the incoming call asking the maker of the incoming call to leave a message, and locally record a voicemail on a local storage media of the device without utilizing the centralized mobile carrier voicemail system and without further participation of the user of the device;

an option to answer the incoming call at the device, play a greeting to the maker of the incoming call asking the maker of the incoming call to leave a message, locally record a voicemail at the device without utilizing the centralized voicemail system operated by the mobile carrier, and screen the voicemail in real time as it is left by the maker of the incoming call using a speaker of the device;

an option to answer the incoming call at the device and play a greeting to the maker of the incoming call asking the maker to please hold; and an option to answer the incoming call at the device and immediately disconnect the incoming call without activating a speaker and a microphone of the device.

20. The device as recited in claim 19, wherein the device is capable of immediately playing a voicemail left at the device without connecting to the centralized mobile carrier voicemail system and without receiving the voicemail from the centralized mobile carrier voicemail system because the voicemail was originally recorded at the device by the device as the voicemail was left by the maker of the incoming call.

* * * * *